(12) United States Patent
Garvey et al.

(10) Patent No.: US 12,119,727 B2
(45) Date of Patent: Oct. 15, 2024

(54) ONE-PIECE GENERATOR HOUSING

(71) Applicant: ILLINOIS TOOL WORKS INC., Glenview, IL (US)

(72) Inventors: Paul William Garvey, Freedom, WI (US); David Edwin Radtke, New London, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 402 days.

(21) Appl. No.: 15/096,402

(22) Filed: Apr. 12, 2016

(65) Prior Publication Data
US 2016/0308418 A1 Oct. 20, 2016

Related U.S. Application Data

(60) Provisional application No. 62/147,270, filed on Apr. 14, 2015.

(51) Int. Cl.
*H02K 5/06* (2006.01)
*B23K 9/10* (2006.01)
(Continued)

(52) U.S. Cl.
CPC .................. *H02K 5/06* (2013.01); *H02K 5/02* (2013.01); *H02K 5/163* (2013.01); *B23K 9/1006* (2013.01)

(58) Field of Classification Search
CPC .......... B23K 9/1006; H02K 5/02; H02K 5/06; H02K 5/163
(Continued)

(56) References Cited

U.S. PATENT DOCUMENTS 2,094,344 A 9/1937 Blankenbuehler
4,173,060 A * 11/1979 Massaro, Jr. .......... G21C 17/00
29/890.031
(Continued)

FOREIGN PATENT DOCUMENTS

CN 102678320 9/2012
CN 103532283 1/2014
(Continued)

OTHER PUBLICATIONS

Machine translation of DE-102013217890-A1, Jun. 2024 (Year: 2024).*
(Continued)

*Primary Examiner* — Geoffrey S Evans
(74) *Attorney, Agent, or Firm* — McAndrews, Held & Malloy, , Ltd.

(57) ABSTRACT

A one-piece generator housing locates and secures the generator stator assembly, rotor bearings, and brush holder, and provides for attachment of the housing assembly to the engine interface. The disclosed one-piece housing completely encloses the stator and rotor assembly of the generator. An embodiment of the one-piece generator housing is applied to welding machine applications that use an in-line engine. With this type of engine, the power take-off (PTO) is normally the engine flywheel, and the variety of engine interfaces to which to mount the generator become more diverse. In an embodiment, the rotor has a flange with integral cooling fan blades that bolts to the flywheel. A shorter adapter is used in order to access the fasteners that attach the rotor shaft to the flywheel. The housing attaches to the adapter using cast-in bosses and bolts.

21 Claims, 25 Drawing Sheets

(51) Int. Cl.
*H02K 5/02* (2006.01)
*H02K 5/16* (2006.01)

(58) Field of Classification Search
USPC .............. 219/133; 74/606 R, 609; 310/10,
310/40 MM, 40 R, 51–52, 58, 64, 71, 80,
310/83, 85, 88, 89, 91, 109, 236, 239,
310/254; 318/89, 91, 109, 236, 239, 254,
318/245, 255; 322/16, 29; 29/596–598
See application file for complete search history.

(56) References Cited

U.S. PATENT DOCUMENTS

| | | | | |
|---|---|---|---|---|
| 4,755,197 | A * | 7/1988 | Benson | F16N 39/002 96/187 |
| 5,519,275 | A * | 5/1996 | Scott | H02K 11/0094 310/216.057 |
| 5,623,175 | A * | 4/1997 | Ronning | H02K 5/203 123/41.31 |
| 6,124,567 | A | 9/2000 | Feldhausen et al. | |
| 6,600,248 | B2 * | 7/2003 | Hara | F02B 63/04 310/89 |
| 8,461,483 | B2 * | 6/2013 | Farah | B23K 9/1006 219/130.1 |
| 8,925,421 | B2 * | 1/2015 | Vanderzyden | F02C 7/32 74/730.1 |
| 9,393,637 | B2 * | 7/2016 | Farah | B23K 9/1006 |
| D773,995 | S * | 12/2016 | Jabaji | D13/112 |
| 9,667,116 | B2 * | 5/2017 | Fujimoto | H02K 5/20 |
| 9,923,429 | B2 * | 3/2018 | Osborne | H02K 5/148 |
| 2009/0229544 | A1 | 9/2009 | Hatsugai | |
| 2011/0025144 | A1 * | 2/2011 | Schartman | H02K 5/203 310/54 |
| 2014/0009125 | A1 | 1/2014 | Vanderzyden et al. | |

FOREIGN PATENT DOCUMENTS

| | | | | |
|---|---|---|---|---|
| CN | 203813598 | | 9/2014 | |
| DE | 102013217890 | A1 * | 3/2015 | ............ H02K 11/33 |
| EP | 2113663 | | 11/2009 | |
| EP | 2166646 | A1 * | 3/2010 | .............. H02K 5/00 |
| WO | WO-2011066981 | A2 * | 6/2011 | .............. H02K 5/06 |
| WO | WO-2014050940 | A1 * | 4/2014 | ............... F16M 1/04 |

OTHER PUBLICATIONS

Machine translation of WO-2011066981-A2, Jun. 2024 (Year: 2024).*
Int'l Search Report and Written Opinion for PCT/US2016/027221 dated Sep. 19, 2016 (19 pages).

* cited by examiner

ONE-PIECE GENERATOR HOUSING

RELATED APPLICATION DATA

This application claims the benefit of priority to U.S. Provisional Patent Application No. 62/147,270 filed Apr. 14, 2015, the entirety of which is incorporated herein by reference to the extent permitted by law.

TECHNICAL FIELD

The present disclosure relates generally to electrical generators, and more particularly to mechanical construction of welding generators used on engine-driven welding machines.

BACKGROUND

In portable engine-driven welding machines, an internal combustion engine provides the mechanical power to rotate a generator that is disposed in a housing connected to the engine. In turn, the generator creates the electrical power for operating the numerous electrical components that enable welding to take place.

Prior engine-driven generator housing designs, such as the one described in U.S. Pat. No. 6,124,567, assigned to the present assignee, employ a multi-piece construction having a front housing and a rear housing. The rear housing mates with relatively large and complex die-cast engine adapters to connect the housing to a small utility engine. The front and rear housings each enclose approximately half of the stator and rotor assemblies. The rotors used in this design do not attach to the engine flywheel but attach directly to the engine output shaft.

SUMMARY

In an embodiment, a one-piece generator housing locates and secures the generator stator assembly, rotor bearings, and brush holder, and provides for attachment of the housing to the engine interface. An embodiment of the one-piece housing completely encloses the stator and rotor assembly of the generator.

An embodiment of the one-piece generator housing is applied to welding machine applications that use an in-line engine. With this type of engine, the power take-off (PTO) is normally the engine flywheel, and the variety of engine interfaces to which to mount the generator become more diverse among manufacturers. In an embodiment, the rotor has a flange with integral cooling fan blades that bolts to the flywheel. A shorter adapter is used in order to access the fasteners that attach the rotor shaft to the flywheel. The housing attaches to the adapter using cast-in bosses and fasteners. The barrel shaped housing of the present disclosure can be cast with specific clearances around the stator assembly for optimum air flow and to reduce the need for additional baffling. Additionally, the generator housing in the disclosed embodiments provides flexibility to be mated with different engine brands and types. Simpler engine adapters can be utilized to adapt different engines to the generator assembly.

In one embodiment, a generator housing is provided. The housing comprises an annular wall having a first side and a second side, as well as a support ring disposed proximate to the first side of the annular wall, the support ring configured to support a rotor shaft bearing of a generator. The housing further includes a plurality of mounting bosses disposed as the second side of the annular wall and configured to attach the housing to an engine adapter. The annular wall has a one-piece construction that encloses the generator.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 1 is a view of an engine-driven welding machine embodying principles disclosed herein.

FIG. 2 is a more detailed view of the embodiment of FIG. 1.

FIG. 3 and FIG. 3A are exterior views of a generator housing embodying principles disclosed herein.

FIG. 4 and FIG. 4A are interior views of the generator housing of FIGS. 3 and 3A.

FIG. 5 and FIG. 5A are views of a stator assembly for a generator.

FIG. 6 is an end view of the stator assembly of FIGS. 5 and 5A within the generator housing of FIGS. 1-4A.

FIG. 7 is a sectional view of the stator assembly of FIGS. 5 and 5A in in the generator housing of FIGS. 1-4A.

FIG. 8 and FIG. 8A are sectional views of a generator within the generator housing of FIGS. 1-4A.

FIG. 9 illustrates a generator and engine coupled together in accordance with principles disclosed herein.

FIG. 10 illustrates details of a generator housing embodying further principles disclosed herein.

FIG. 11 and FIG. 11A illustrates a generator housing with vibration isolators in accordance with further principles disclosed herein.

FIG. 12 illustrates an end view of the generator housing with vibration isolators of FIGS. 11 and 11A.

FIGS. 13 and 13A illustrate a generator housing with other vibration isolators in accordance with further principles disclosed herein.

FIG. 14 is an end view of the generator housing with other vibration isolators of FIGS. 13 and 13A.

FIG. 15 is a sectional view of generator housing of FIGS. 1-4A with stator assembly therein.

FIG. 16 an end view of generator housing of FIGS. 1-4A with stator assembly therein.

FIG. 17 is an exploded view illustrating attachment of the generator housing of FIGS. 1-4A to an engine.

FIG. 18 and FIG. 18A illustrate and end view of the an engine to which a generator can be secured in accordance with principles disclosed herein.

FIG. 19 an end view of an engine illustrating another arrangement for securing an generator thereto in accordance with further principles disclosed herein.

DETAILED DESCRIPTION

Figure 1:
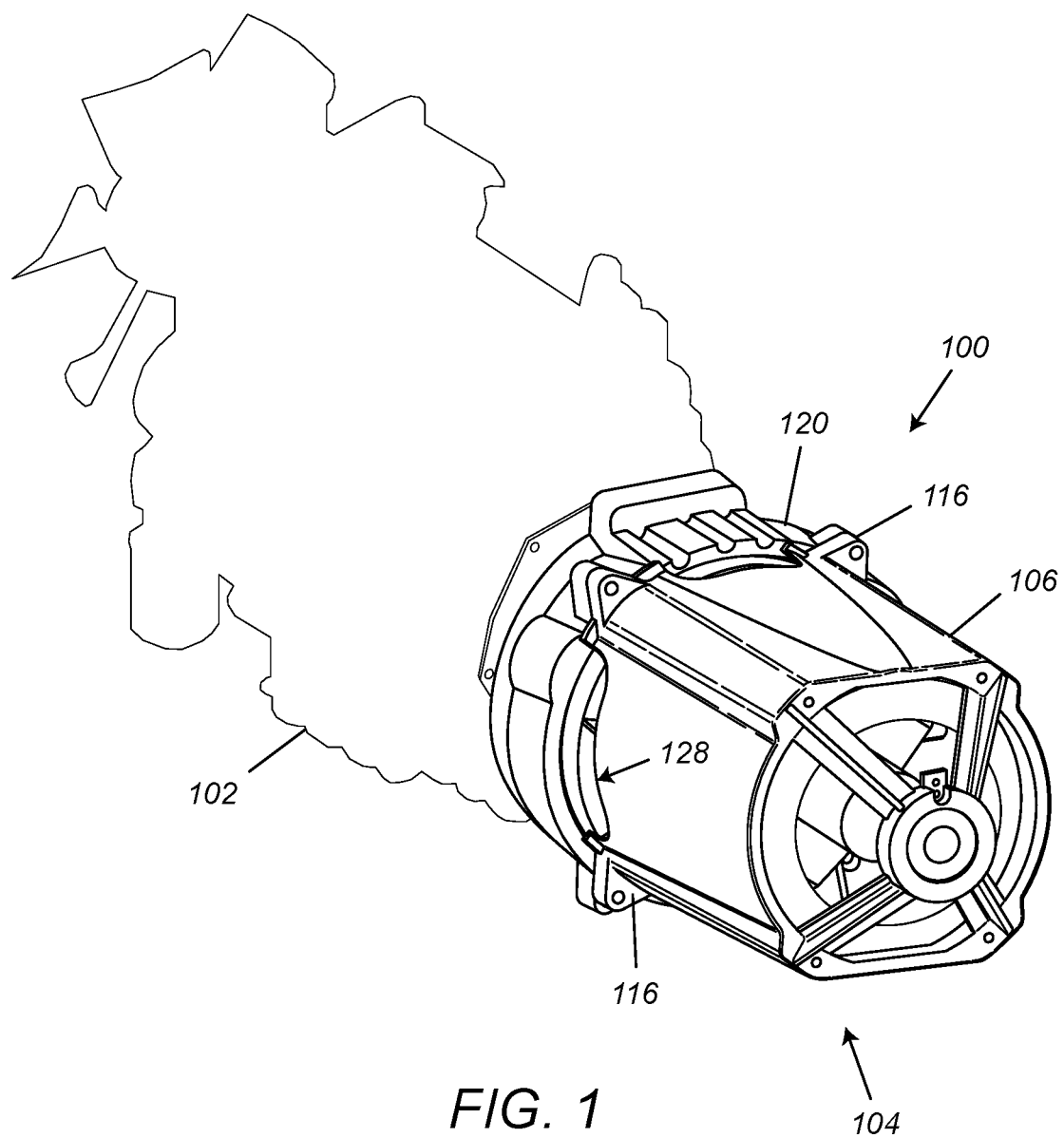
FIGS. 1-19 are diagrams illustrating embodiments of the engine-driven generator housing assembly in accordance with the present disclosure.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Figure 2:
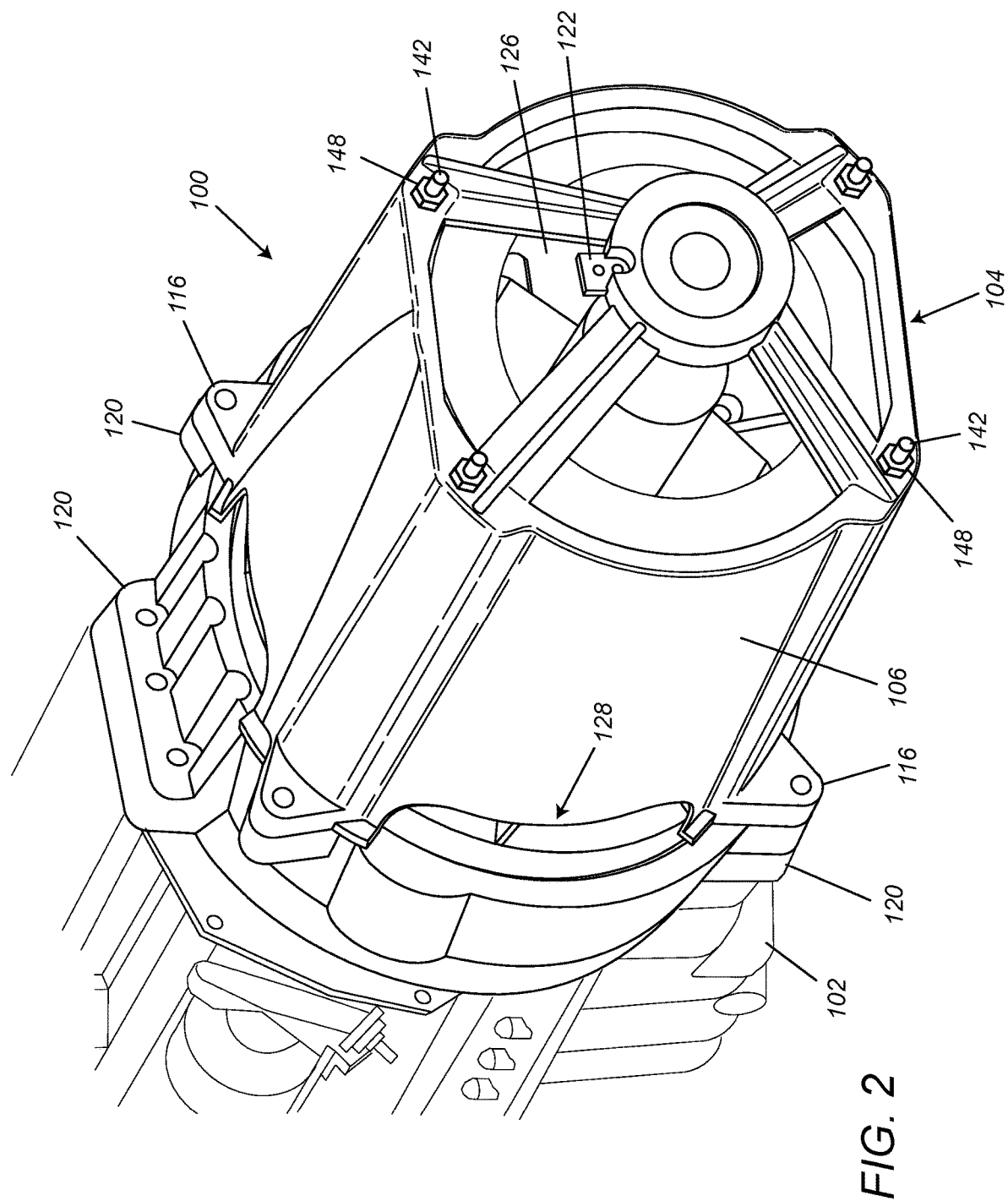

Referring to FIGS. 1-2, an embodiment of an engine-driven welding machine 100 is illustrated. The welding machine 100 includes an internal combustion engine 102 operatively connected to an electric generator 104 disposed inside a generator housing 106. In the illustrated embodiment, the engine 102 is an inline diesel engine, however those skilled in the art will realize that the generator and housing of the present disclosure are compatible with different engine types and layouts, including gas-powered engines, liquid cooled engines, air cooled engines, as well as engines employing alternate cylinder layout configurations. Advantageously, as discussed in further detail below, an embodiment of the generator housing 106 employs a one-piece construction that locates and secures the generator stator assembly, rotor bearings, and brush holder, provides for attachment of the housing to the engine interface, and completely encloses the stator and rotor assemblies of the generator 104.

Figure 8:
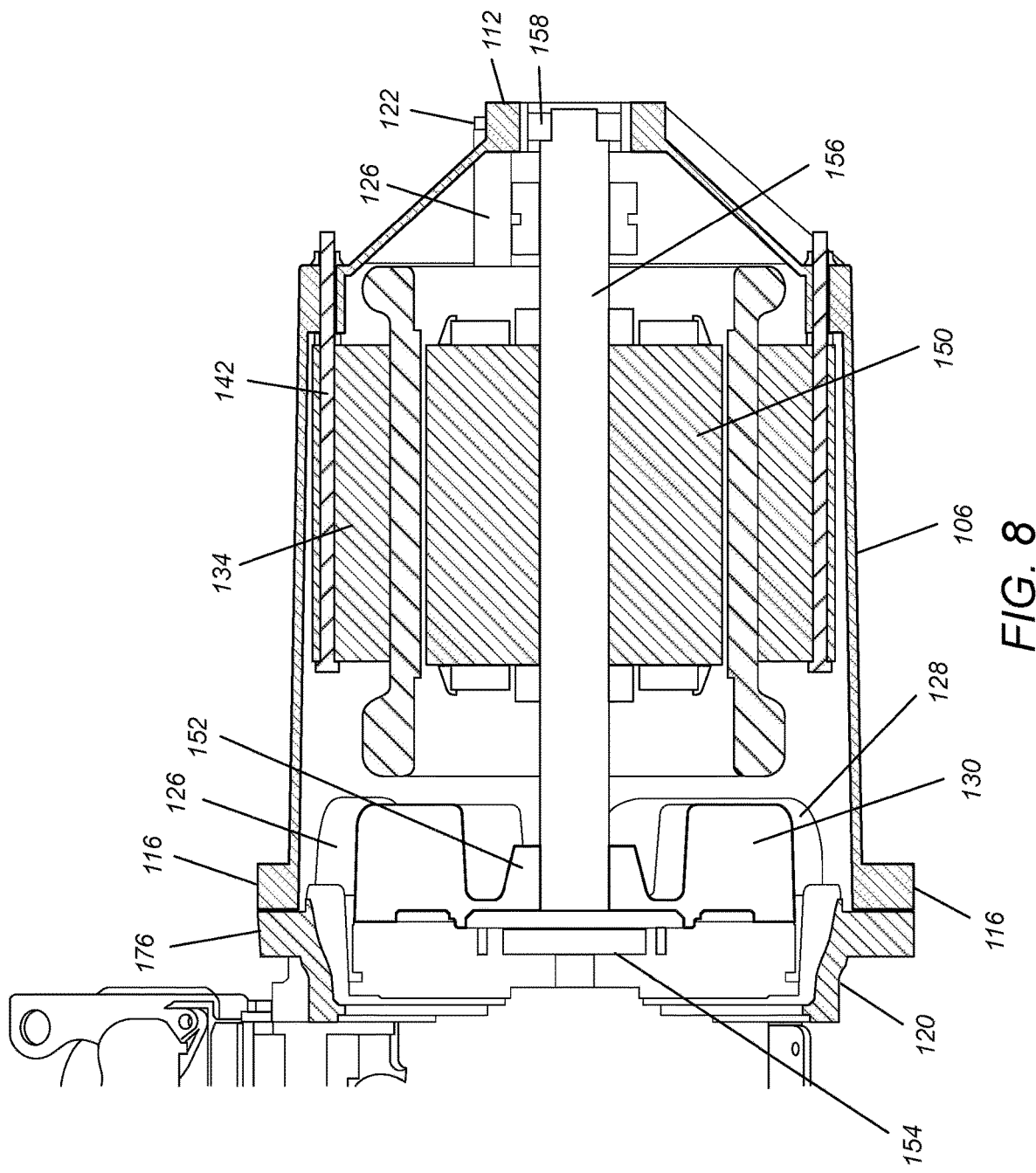
Figure 8A:
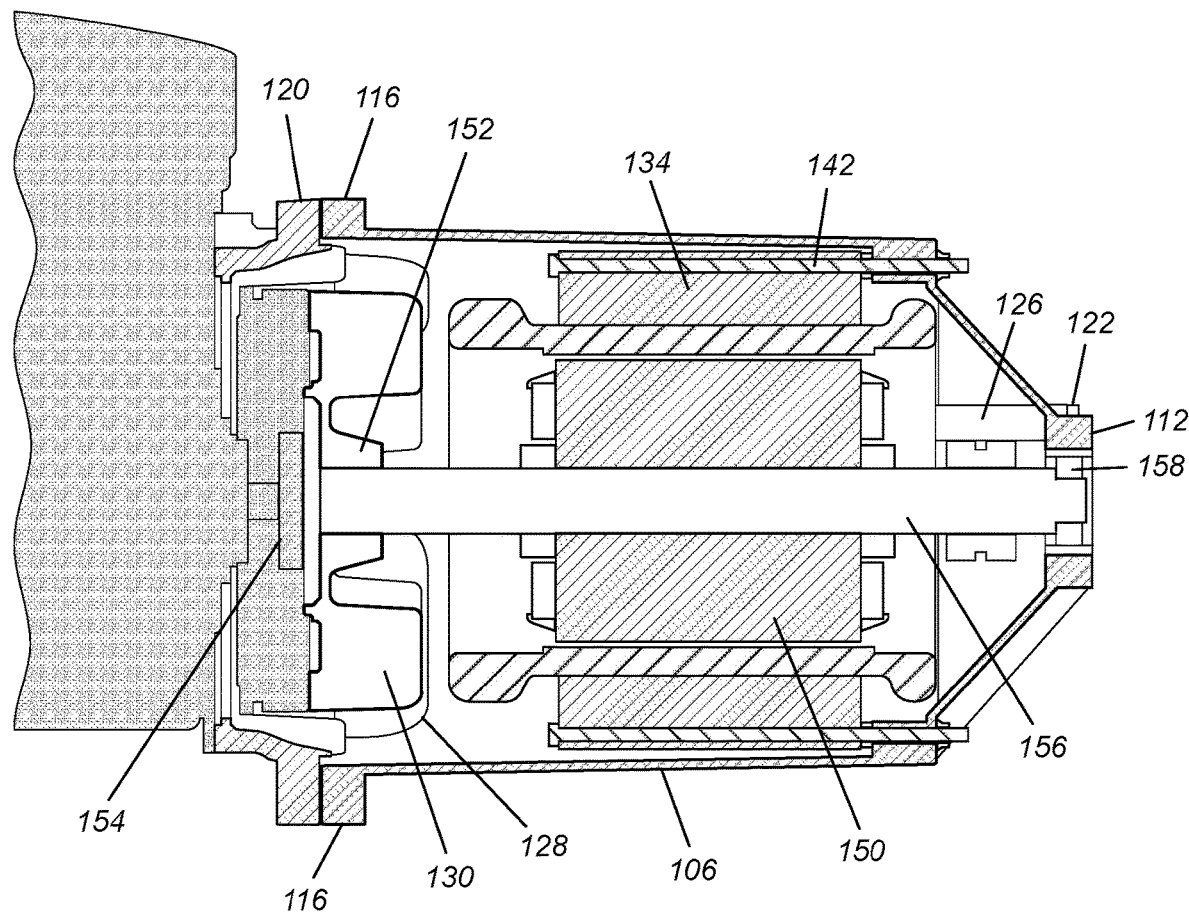
Figure 9:
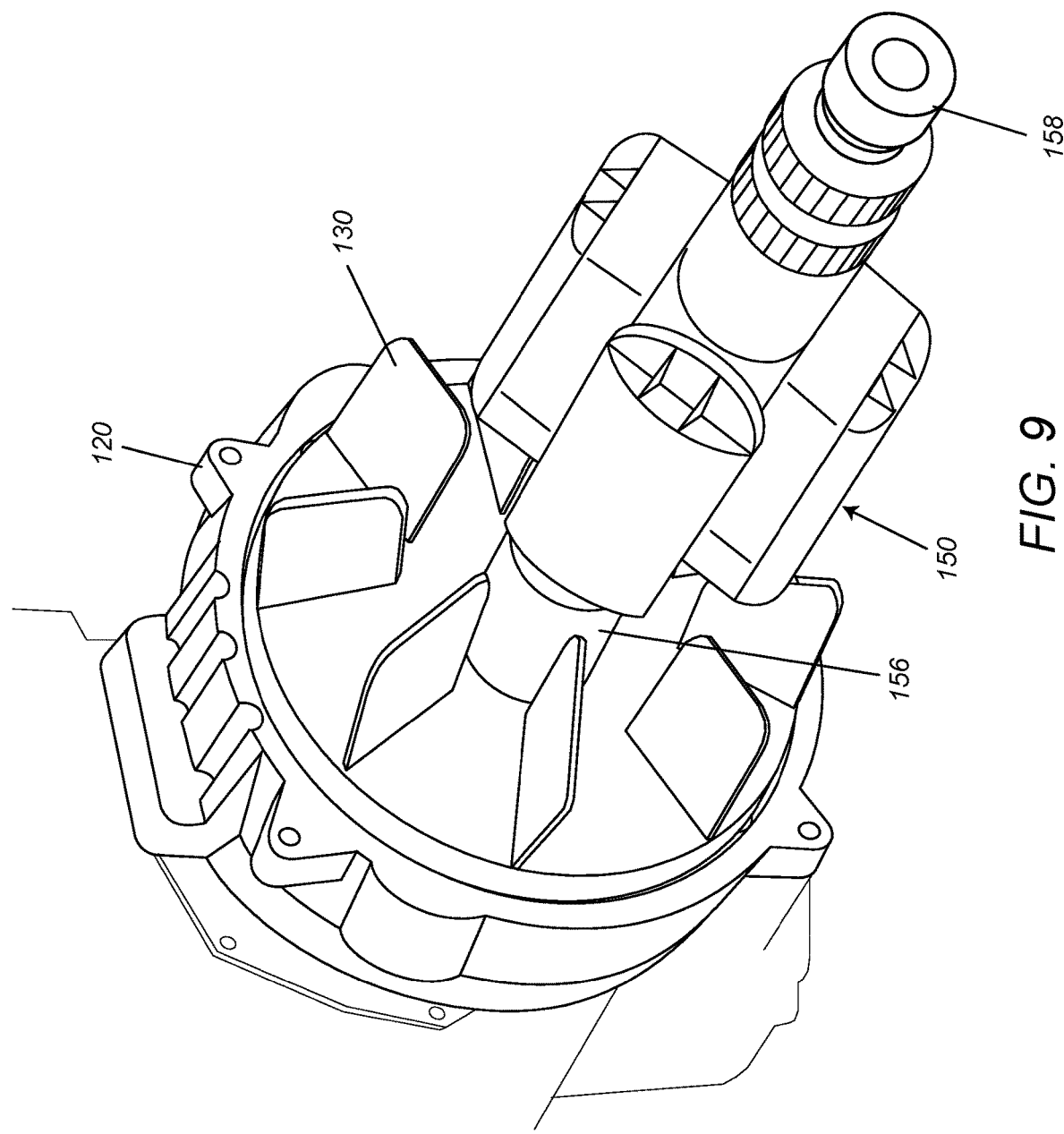
Figure 9A:
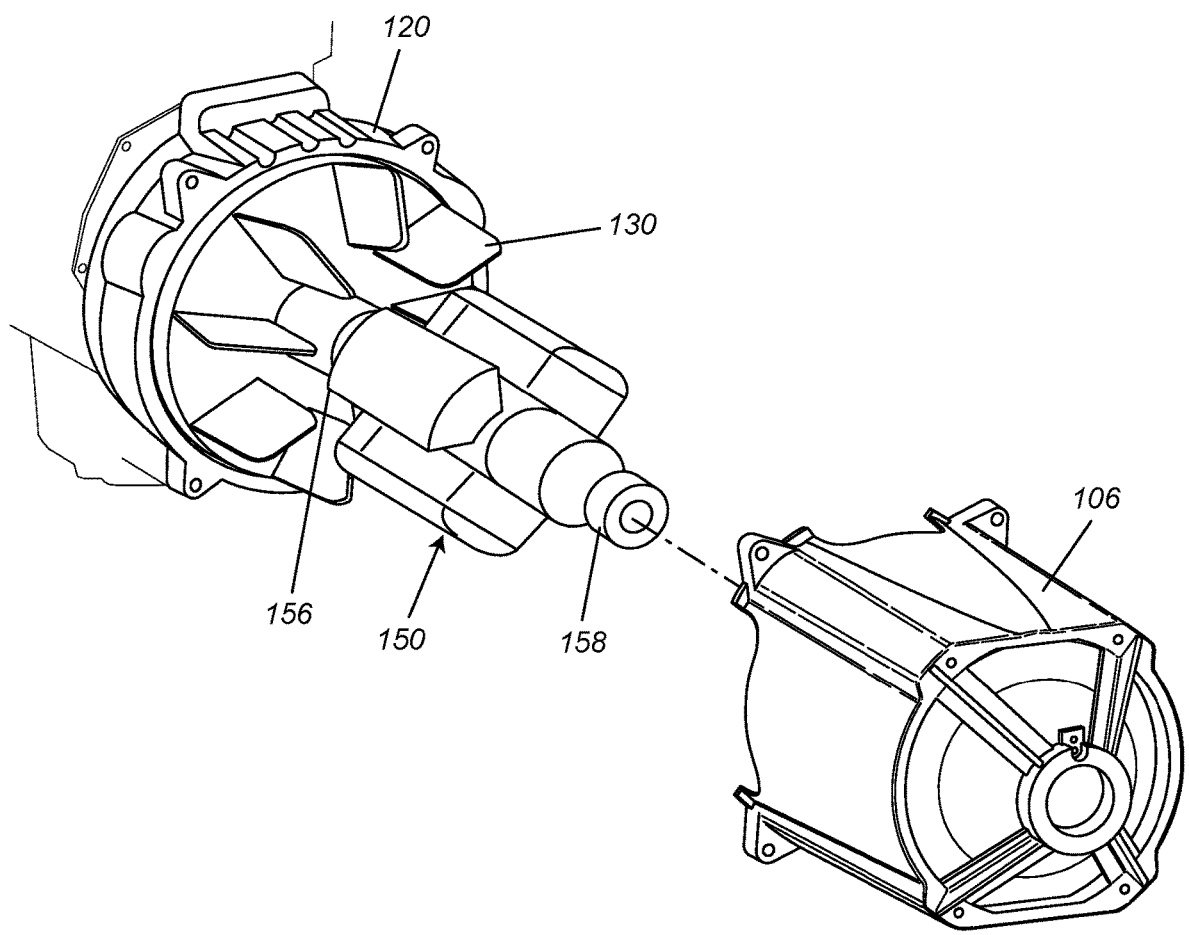
FIG. 9A illustrates a generator and its rotor assembly in accordance with principles disclosed herein.

As shown in FIGS. 3, 3A, 4, and 4A, an embodiment of the housing 106 has a one-piece aluminum die cast construction. The housing 106 has an annular wall 108 having a first side 110 with a support ring 112 for supporting a rotor shaft bearing. The support ring 112 projects outwardly from the housing 106 and is connected to the housing 106 via a plurality of angled tips 113 disposed along the external diameter of the support ring 112. In the illustrated embodiment, each angled tip 113 has a ribbed surface facing outward and/or inward of the housing 106. The annular wall 108 further includes a second side 114 having a plurality of cast-in mounting bosses 116 and piloting features 118 for attachment of the housing 106 to an engine adapter 120 (FIGS. 1, 2). In an embodiment, each mounting boss 116 includes a pair of machined piloting surfaces 118 machined to mate with an engine adapter 120 that is particular to a given engine model or type. Preferably, the housing 106 is compatible with different engines 102 via engine-specific engine adapters 120, whereby each piloting surface 118 and/or a surface 119 (FIG. 4) of each mounting boss 116 is shaped, e.g., by machining, to mate with a particular engine adapter 120. The mounting bosses 116 each include a through-hole 117 for attaching to the mounting bosses 176 of the engine adapter 120 via a respective fastener (FIG. 8). A tab 122 to mount a brush holder 126 (FIG. 2) is disposed on the support ring 112 that supports the rotor shaft bearing. In the illustrated embodiment, the tab 122 includes a pair of through-holes 124 for mounting a brush holder 126 via a pair of fasteners, (e.g., bolts).

Figure 3:
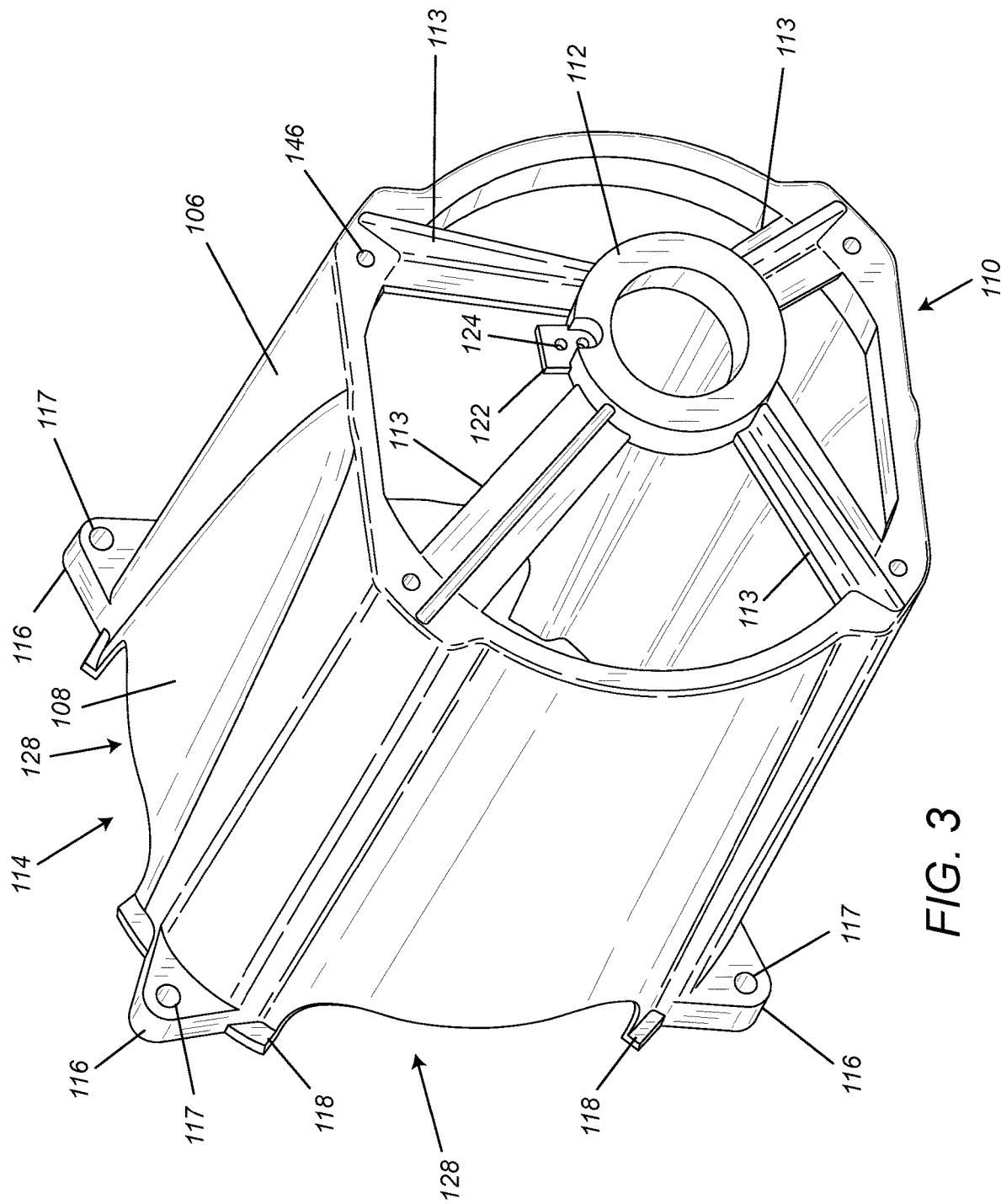
Figure 3A:
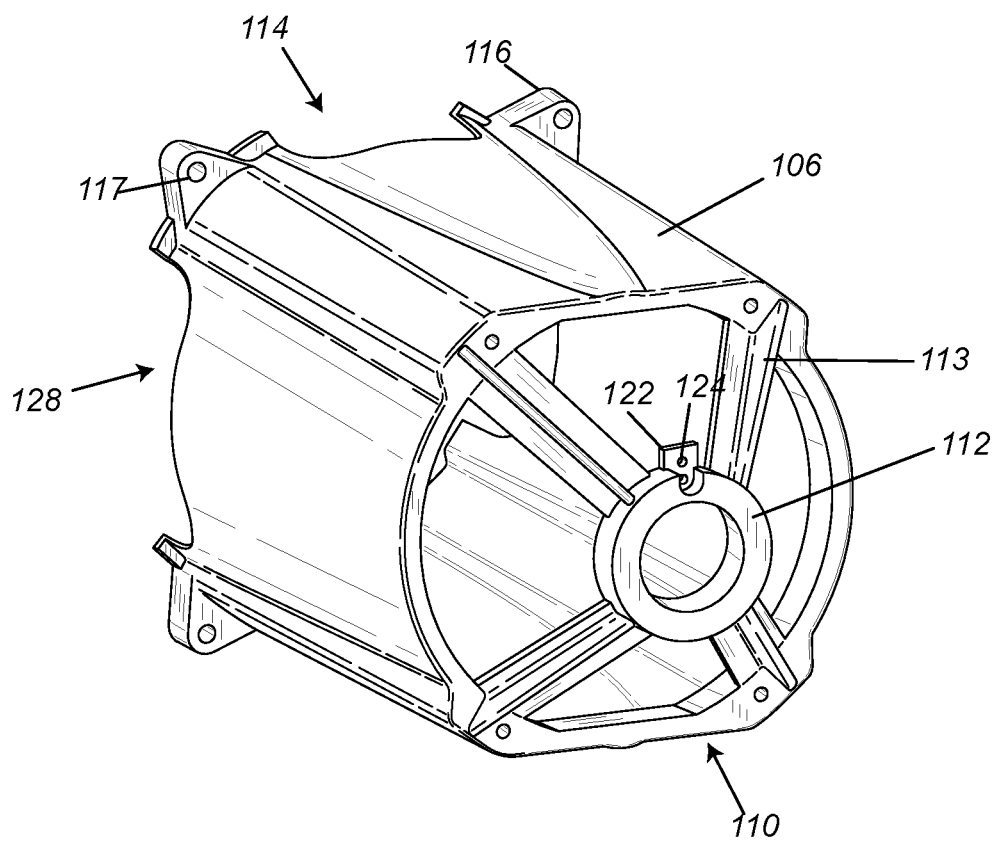
Figure 4:
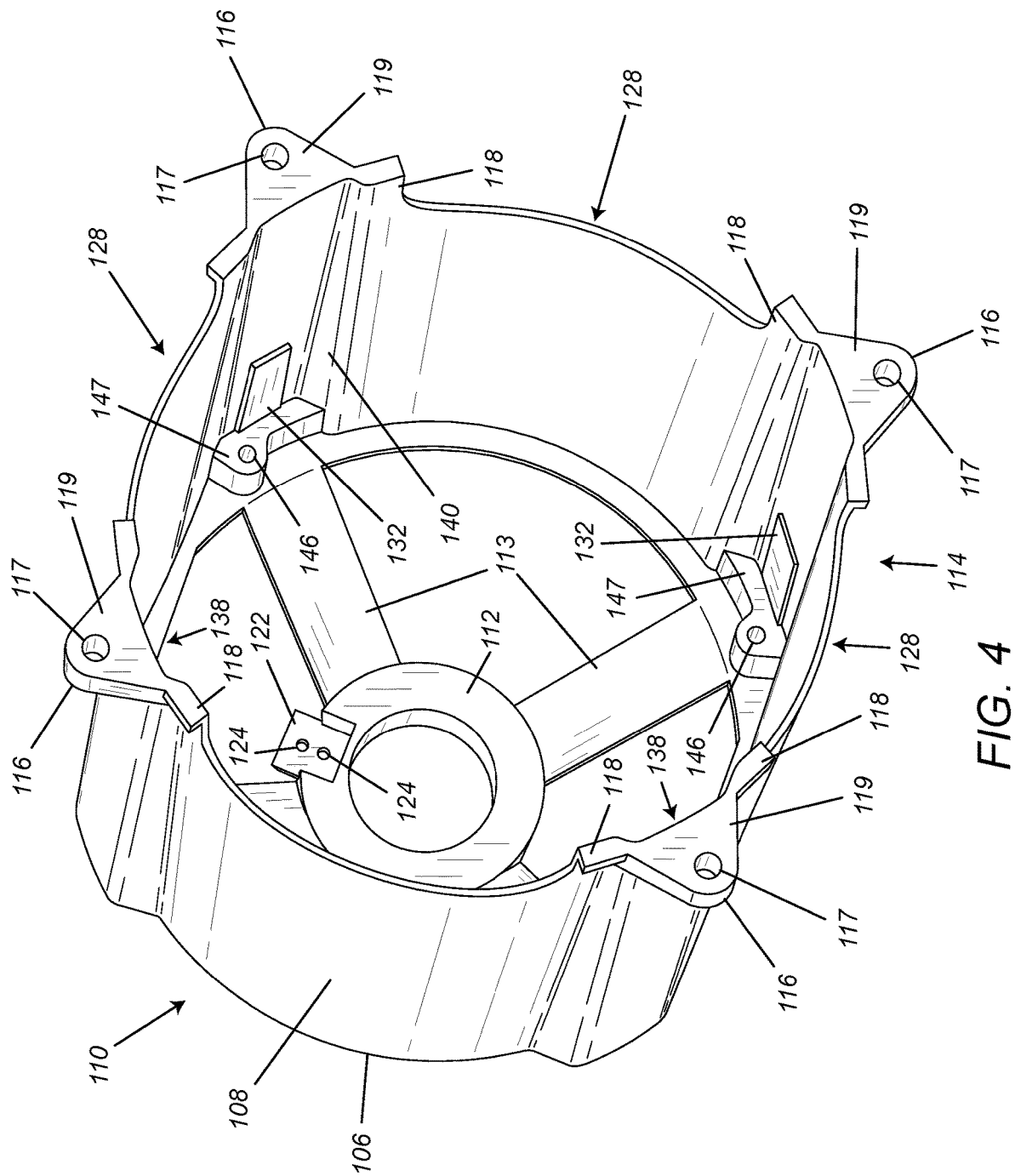
Figure 4A:
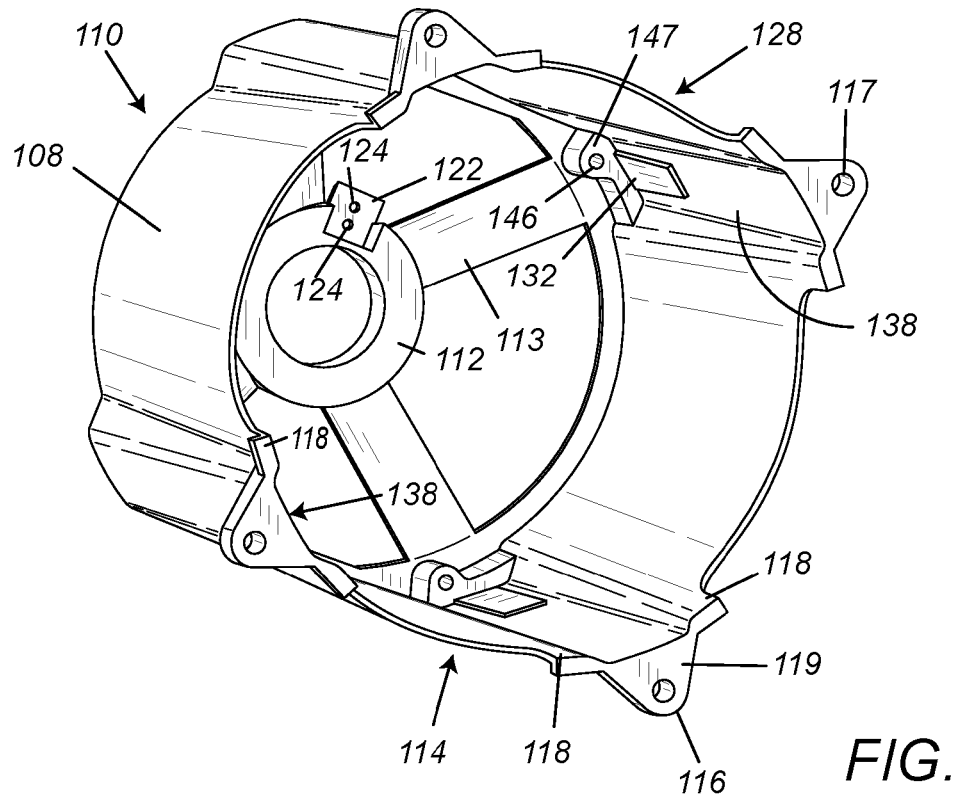

In the illustrated embodiment of FIGS. 3 and 4, the engine adapter mounting side 114 of the housing 106 includes cutouts 128 along its circumference in order to provide air circulation in the generator via the fan 130 (FIG. 8). As shown in FIG. 4, interior of the annular wall 108 of the housing 106 proximate to where an end of each of the angled tips 113 meets the annular wall 108 includes machined stator piloting features 132. The stator piloting members 132 are machined metal surfaces that center the stator assembly 134 depicted in FIGS. 5, 5A. As shown in FIG. 6, the stator assembly 134 is comprised of laminated layers of steel and includes ridges 136 that slide into the respective channels 138 in the housing 106. In an embodiment, the ridges 136 rest against the channel guides 140 and pilot on the stator piloting tabs 132 inside the housing 106 so as to make the stator assembly 134 concentric with the housing 106. Advantageously, use of the piloting members 132 reduces the overall piloting area for centering the stator assembly 134.

Figure 5:
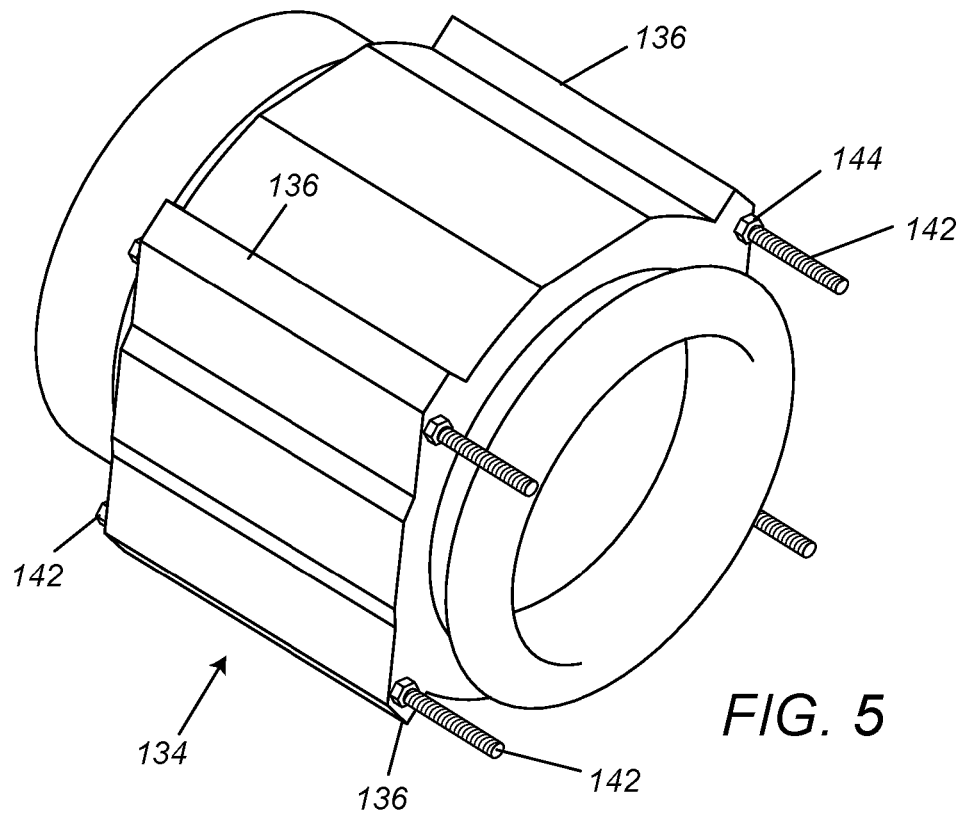
Figure 5A:
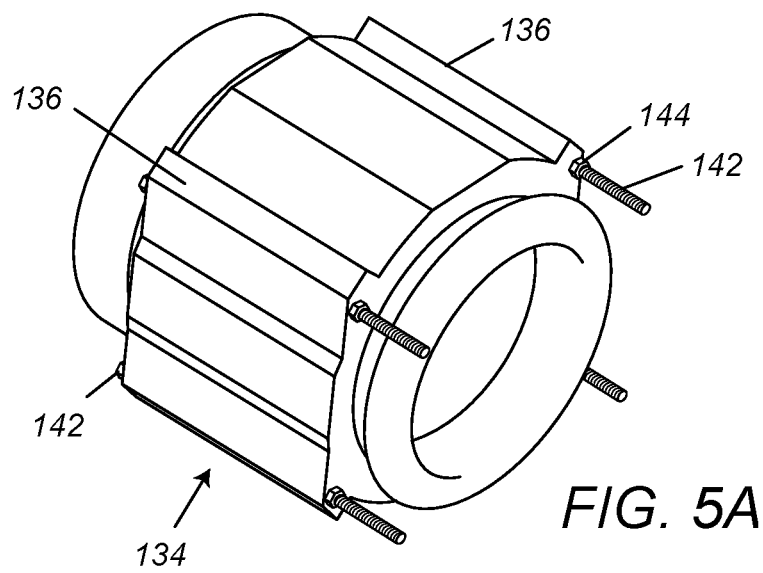
Figure 6:
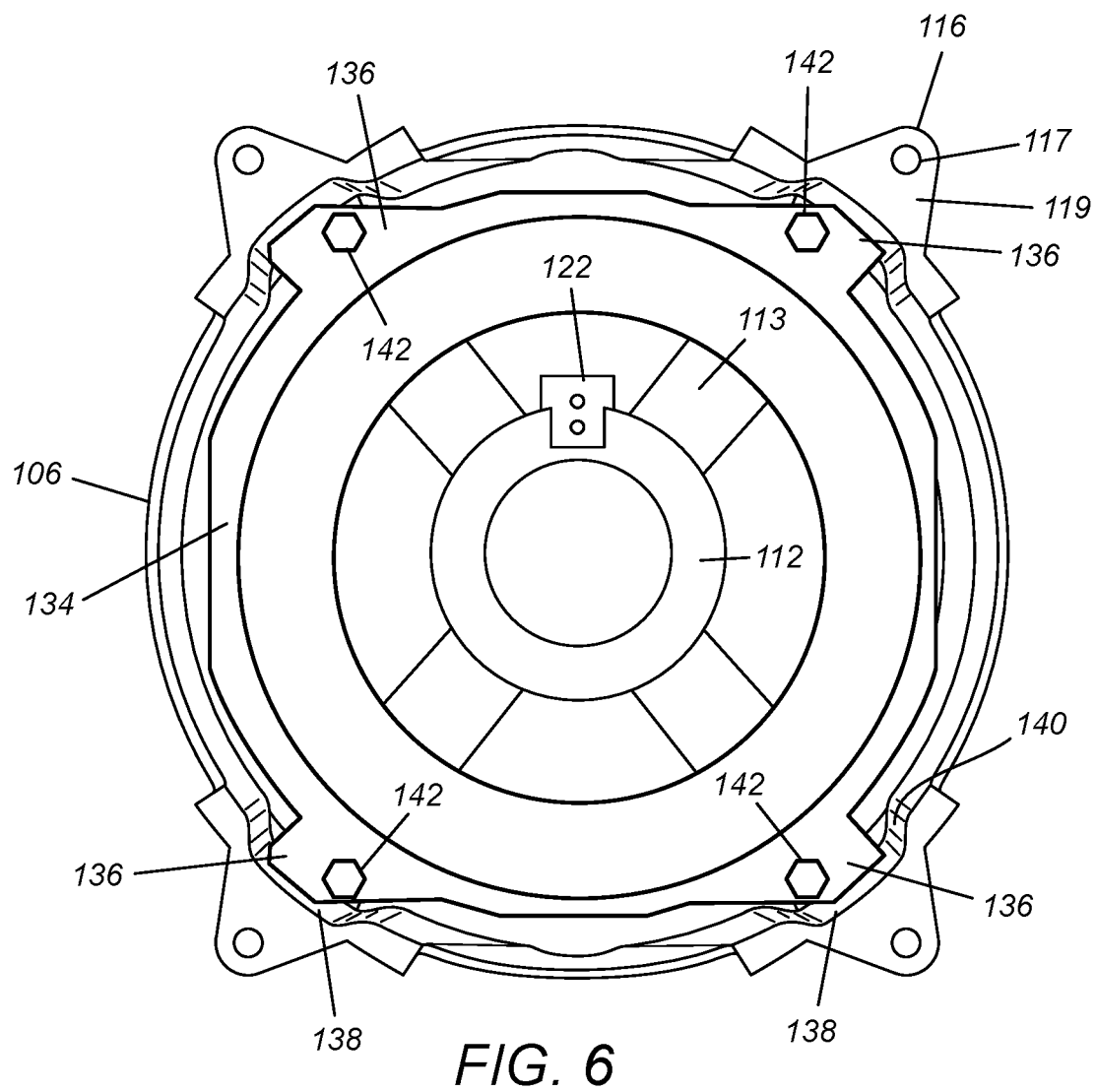
Figure 7:
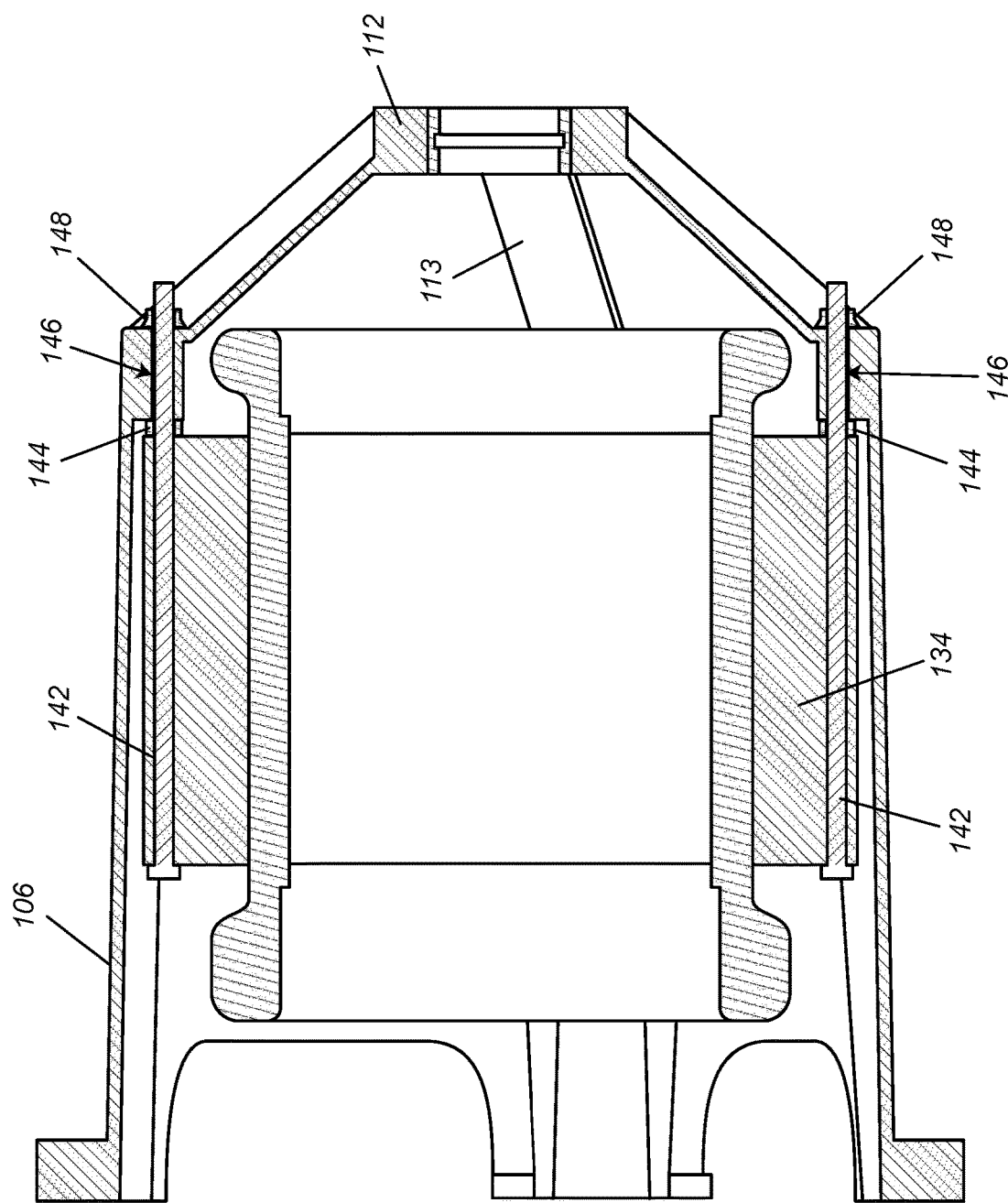

As shown in FIG. 5 and FIG. 7, the stator assembly lamination stack is bolted together via the bolts 142 and nuts 144 with the remaining threaded portion of the bolts 142 projecting out of the stator assembly 134. To assemble the stator to the housing 106, the stator assembly 134 slides into the channels 138 in the housing 106, whereby the threaded portions of the bolts 142 that remain external to the stator assembly 134 pass through the respective holes 146 (FIG. 4) of the bosses 147 cast into the interior of the housing 106. The bolts 142 are fastened to the exterior of the housing 106 via nuts 148.

Referring to FIGS. 8, 8A, 9 and 9A, the rotor 150 has a flange 152 with integral cooling fan blades 130 that bolts to the engine flywheel 154 and connects to the rotor shaft 156. Advantageously, a shorter adapter 120 is used in order to access the fasteners that attach the flange 152 to the flywheel 154. The rotor shaft bearing 158 is supported by the support ring 112. The housing 106 mates with pilot on the engine adapter 120 and attaches with bolts through the mounting bosses 116, 176.

Figure 10:
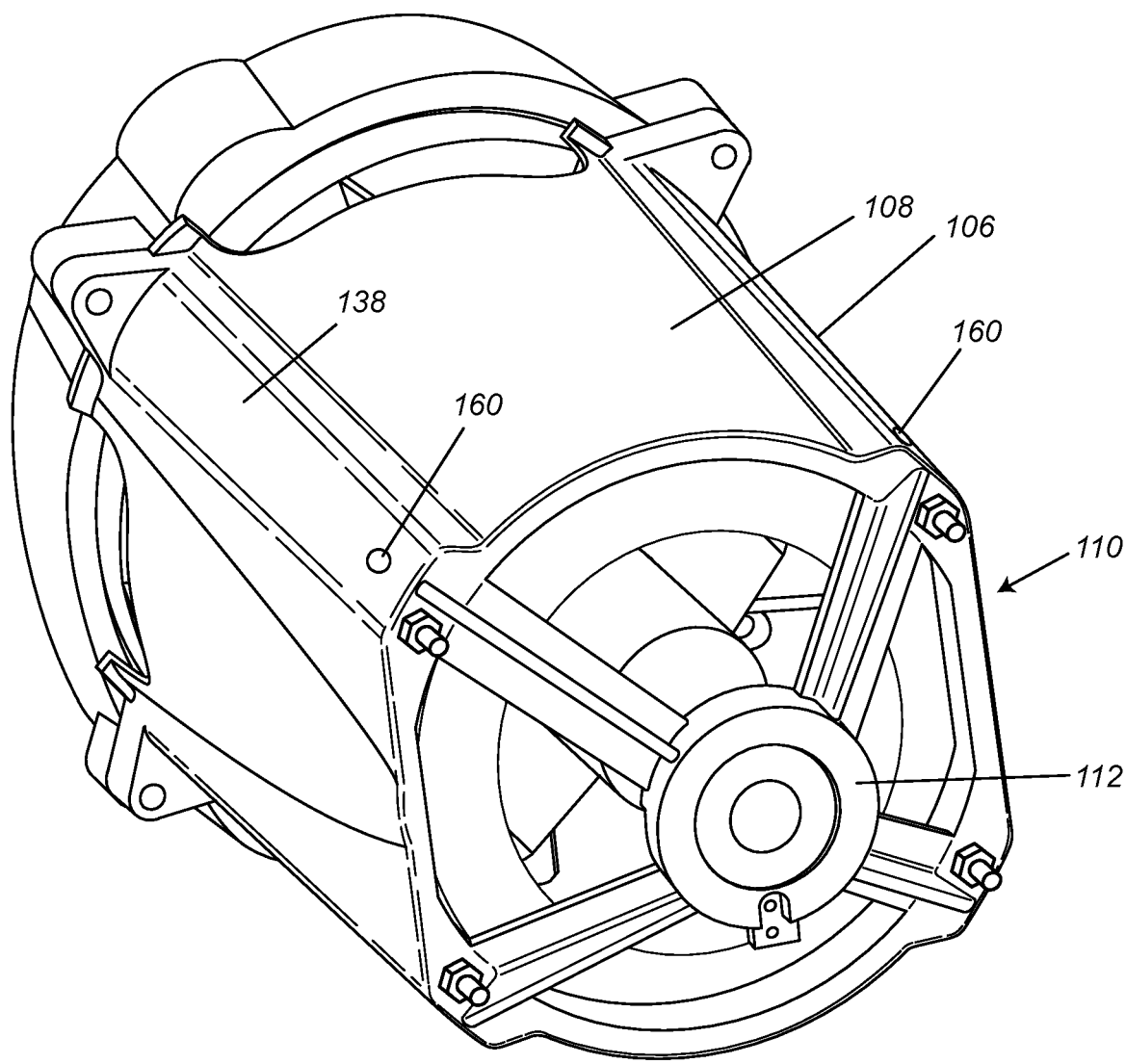
Figure 11:
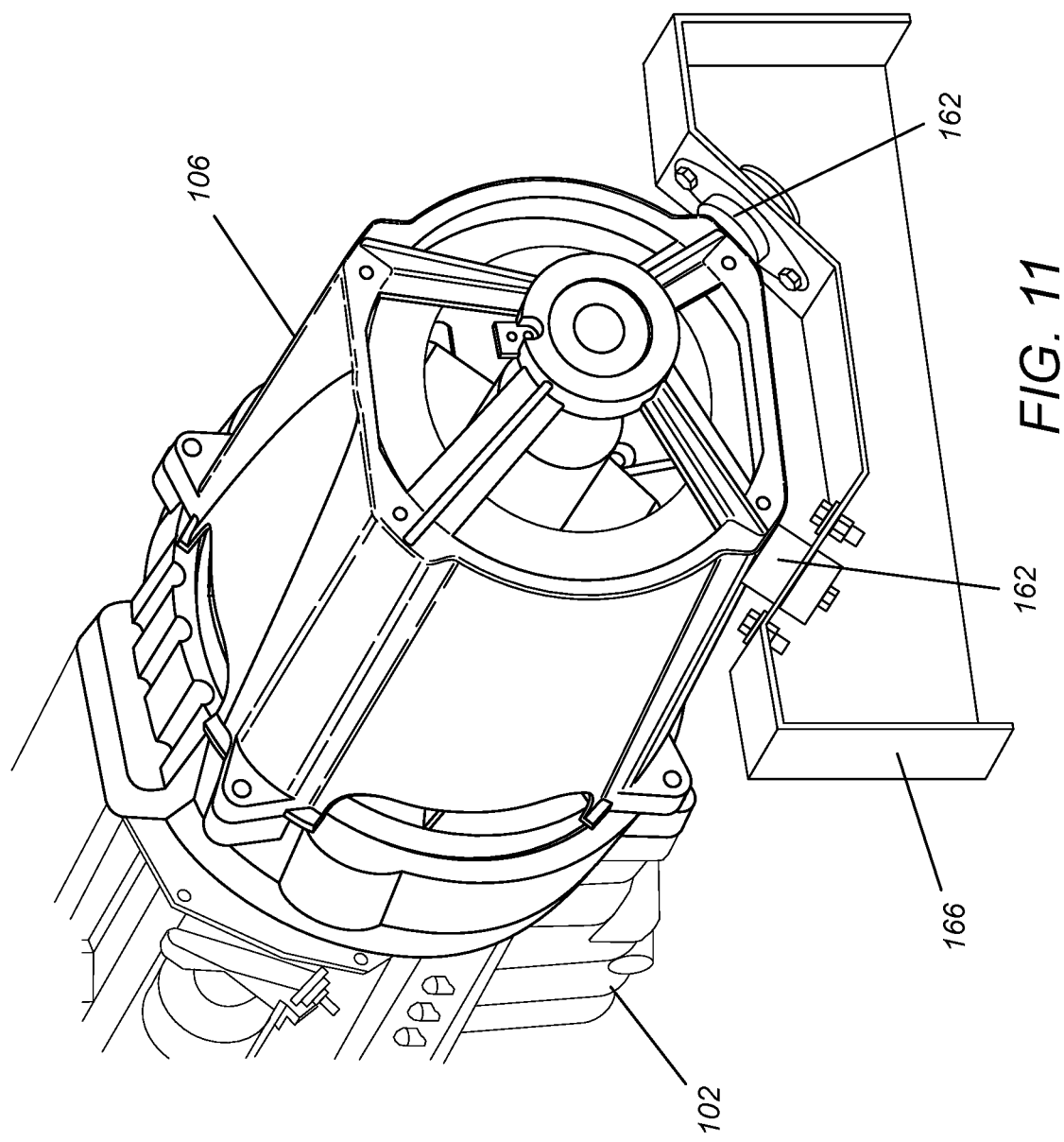
Figure 11A:
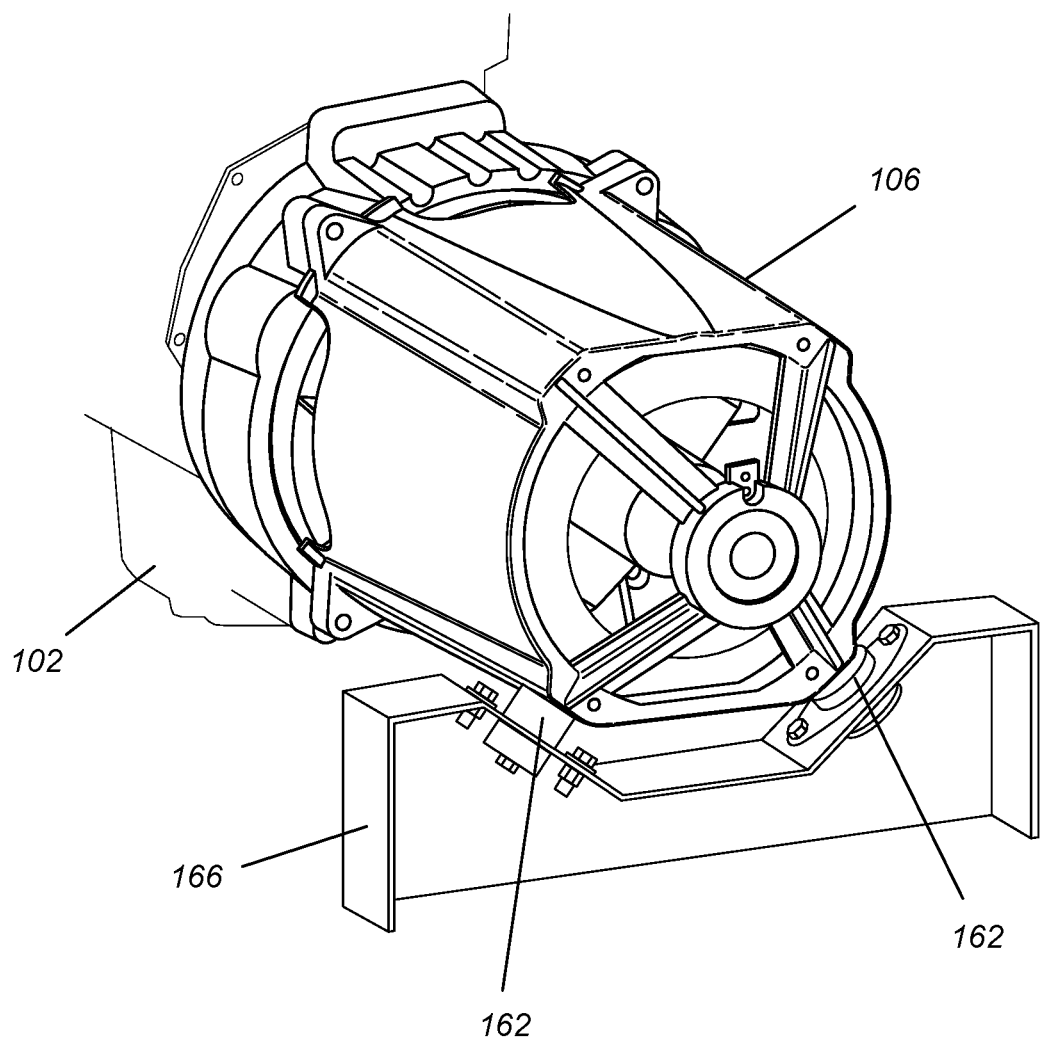
Figure 12:
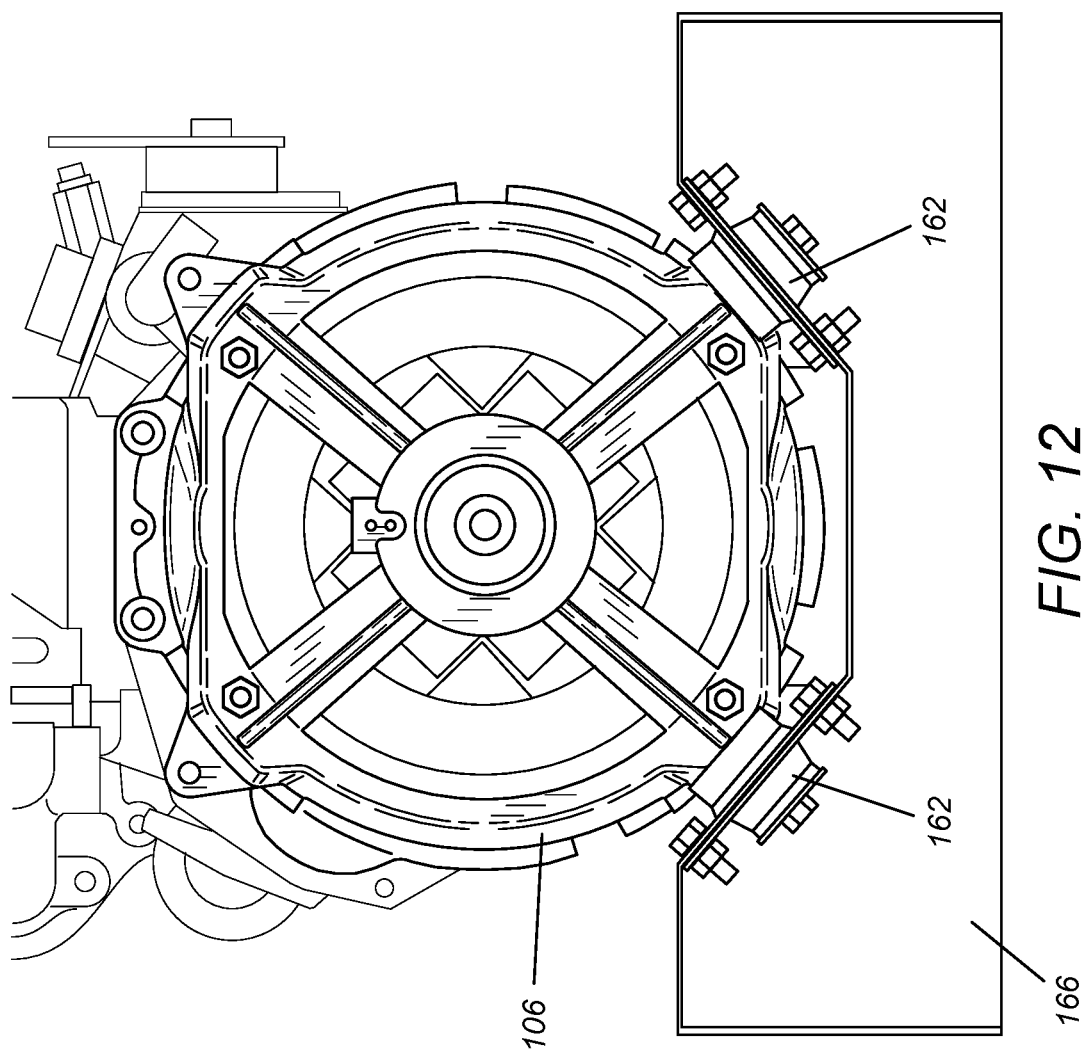
Figure 13:
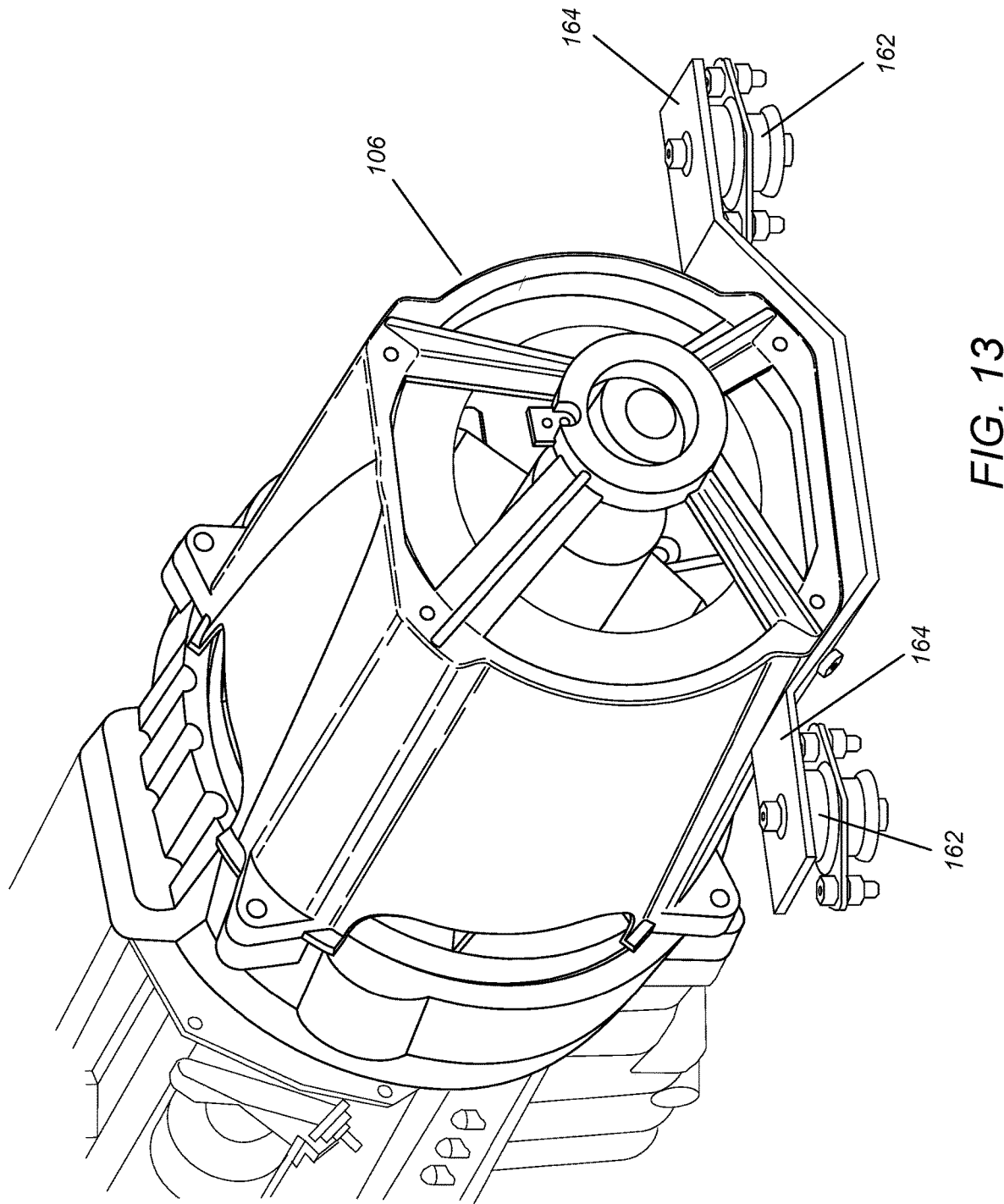
Figure 13A:
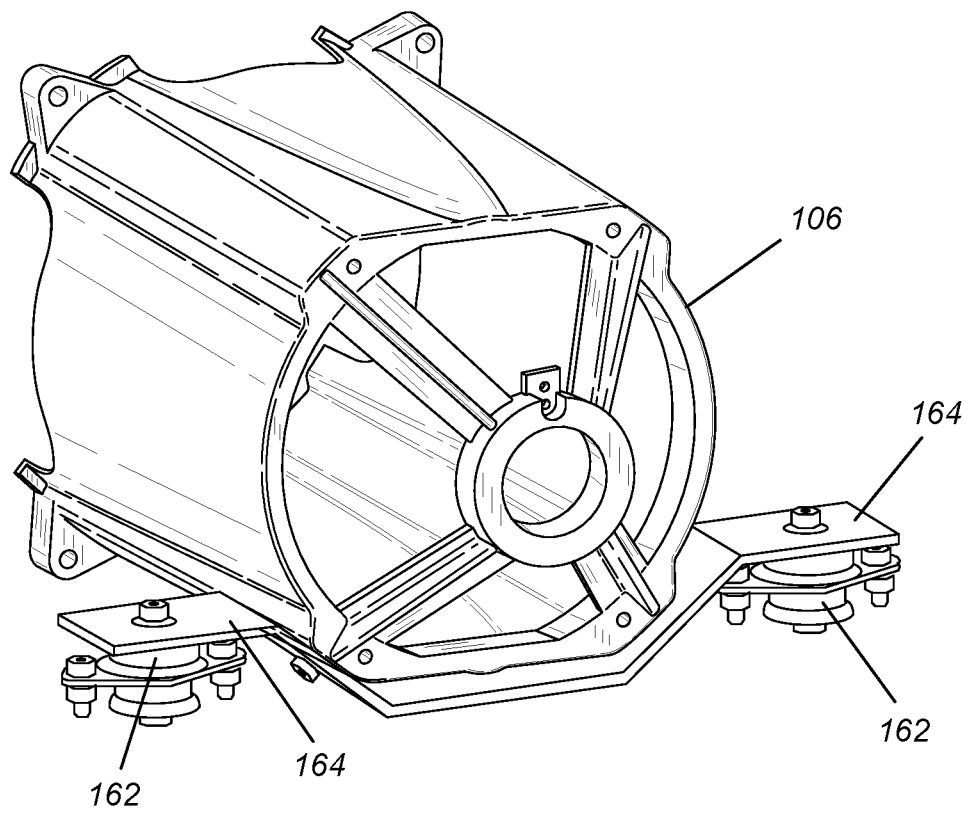
Figure 14:
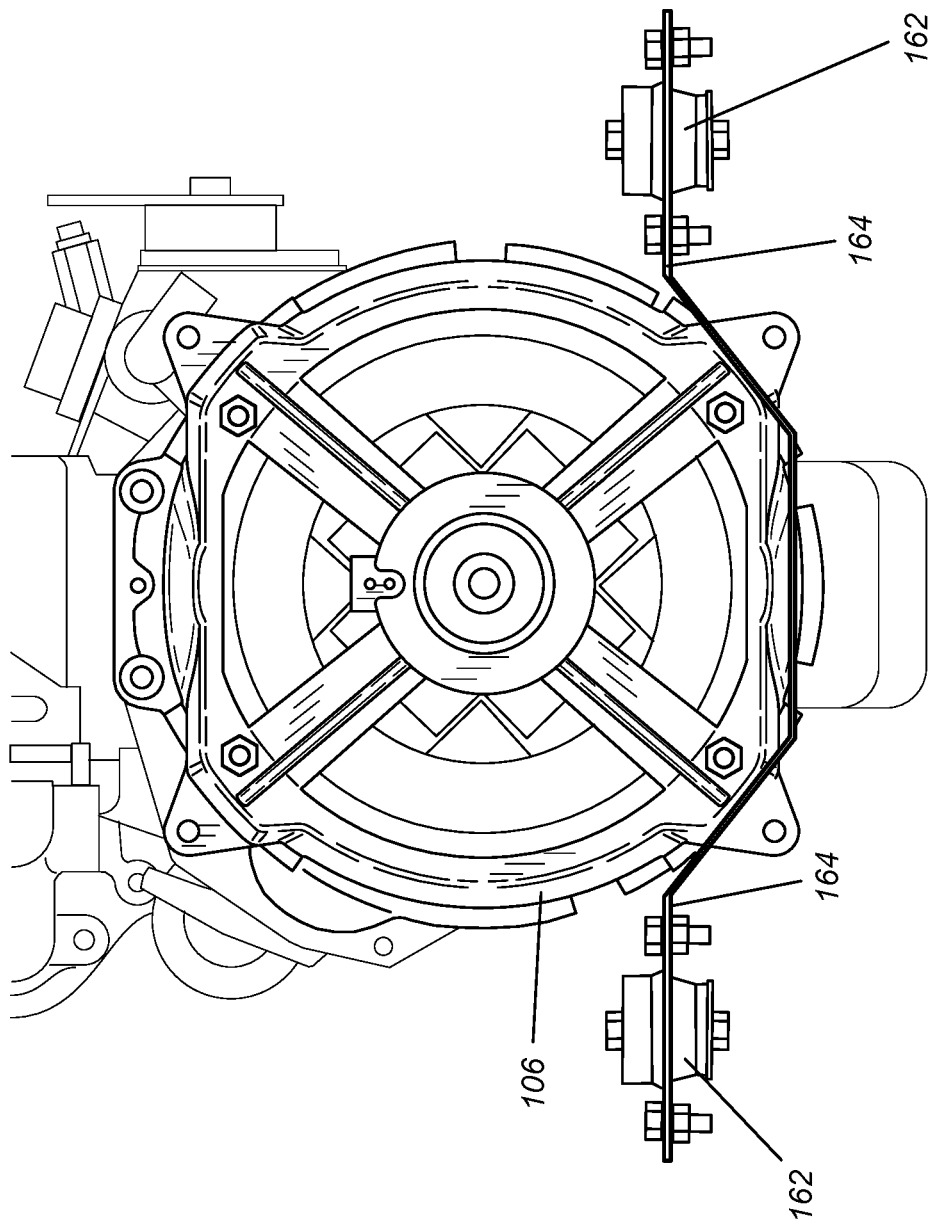

Referring to FIG. 10, the first side 110 of the annular wall 108, that is proximate to the support ring 112, includes two tapped holes 160. In the illustrated embodiment, the tapped holes 160 are disposed on the exterior of the channels 138 of the housing 106 corresponding to the location where the stator mounting features 132, 147 (FIG. 4) were cast in the housing interior. As further shown in FIGS. 11, 11A, 12, 13, 13A, and 14, the tapped holes 160 are added for attaching the vibration isolators 162 (FIGS. 11-12) or the mounting bracket 164 (FIGS. 13-14). The vibration isolators 162 are then attached to the machine frame 166 in both embodiments. In the embodiment of FIGS. 13-14, the vibration isolators 162 may be oriented as shown, or the bracket and frame structure may be configured so that the isolators 162 are at an angle to get the desired isolation characteristics. To help distribute load, the location of the tapped holes 160 takes advantage of the extra material thickness created when the stator mounting features 132, 147 were cast in the housing 106. Additionally, in one embodiment, the thickness of the housing 106 at the location of the tapped holes 160 may be greater than the thickness of the housing 106 proximate to the engine adapter mounting side 114.

Figure 15:
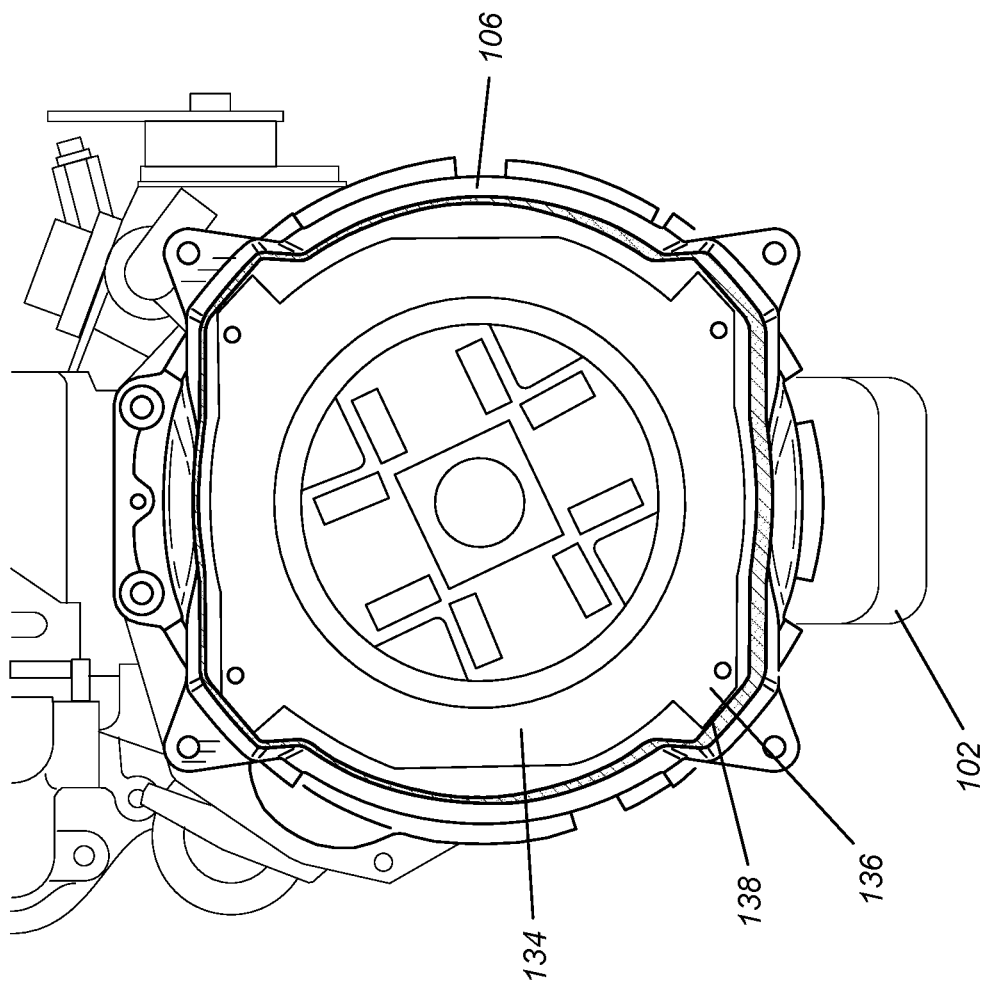
Figure 16:
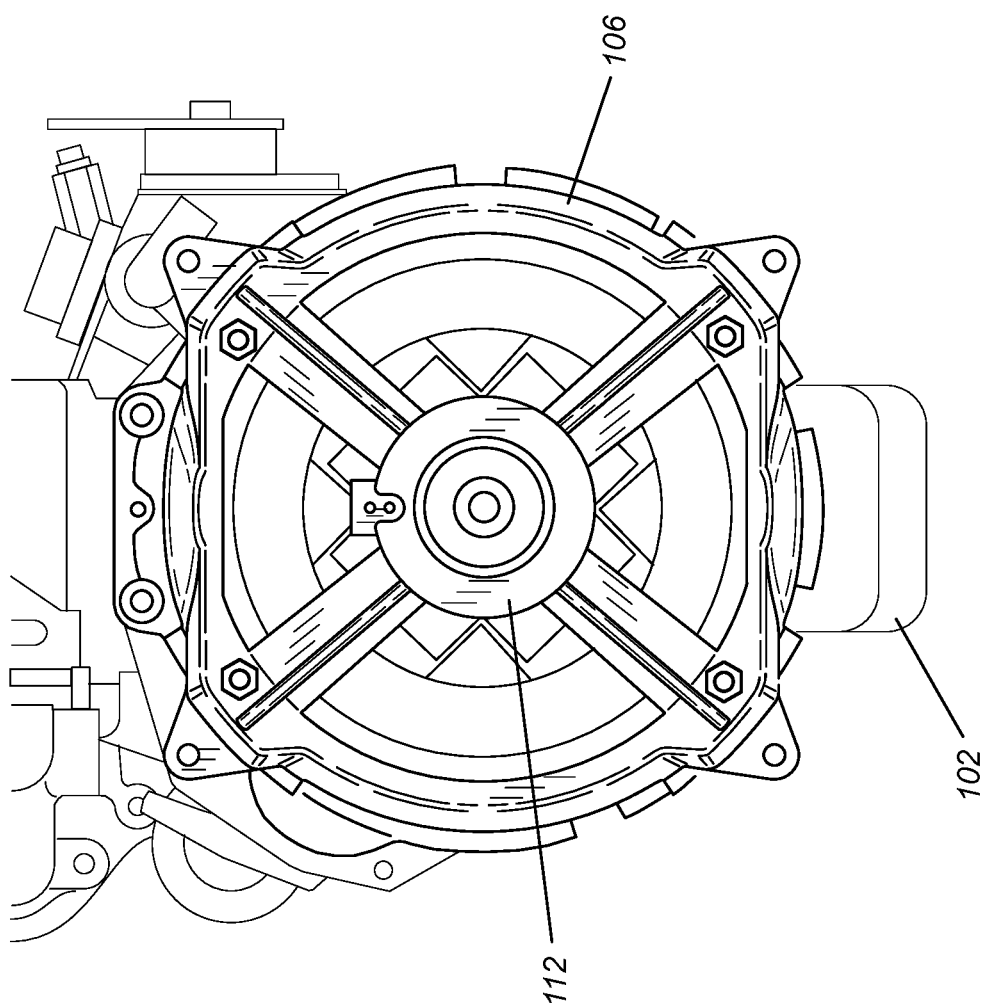
Figure 17:
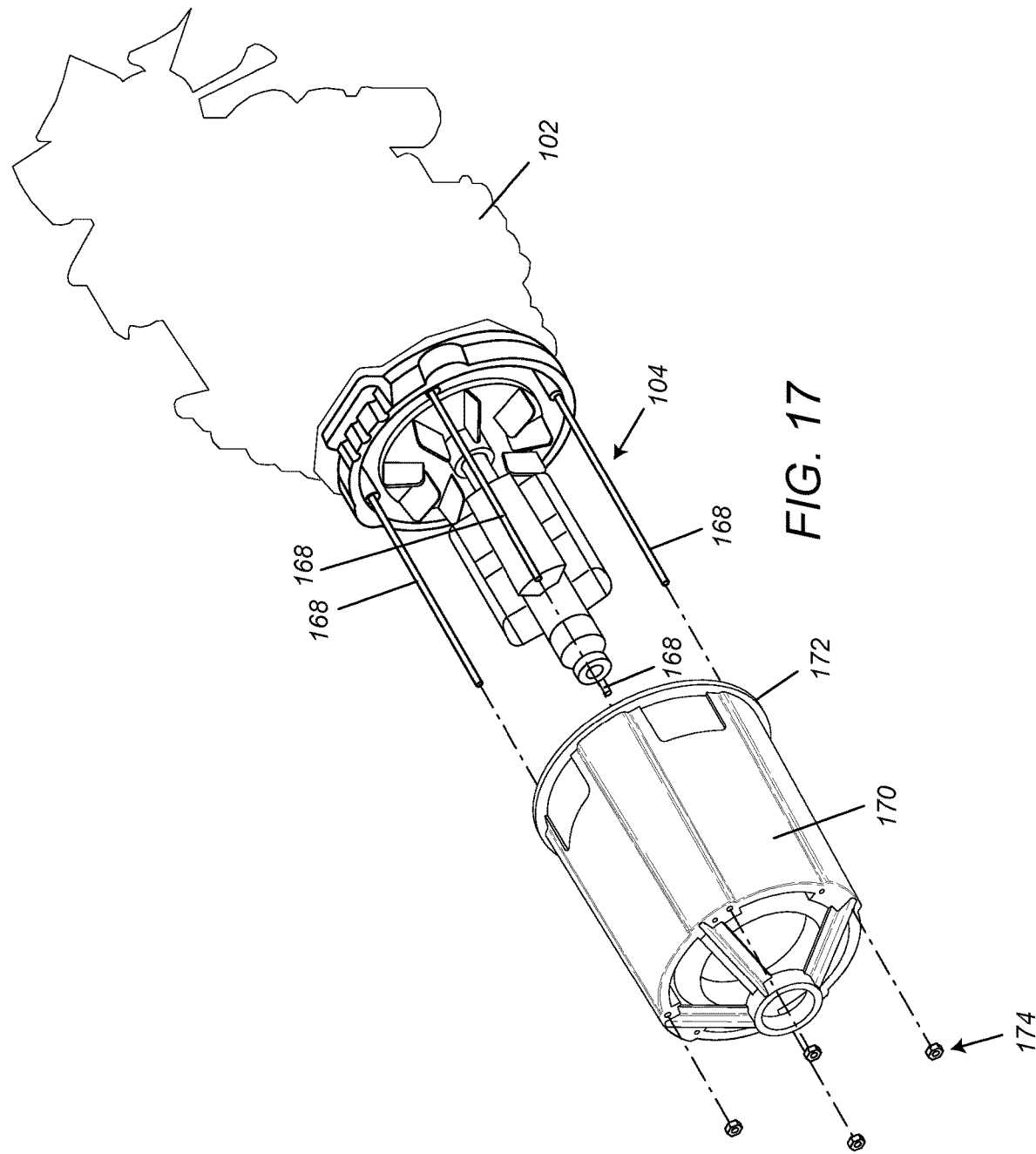
Figure 18:
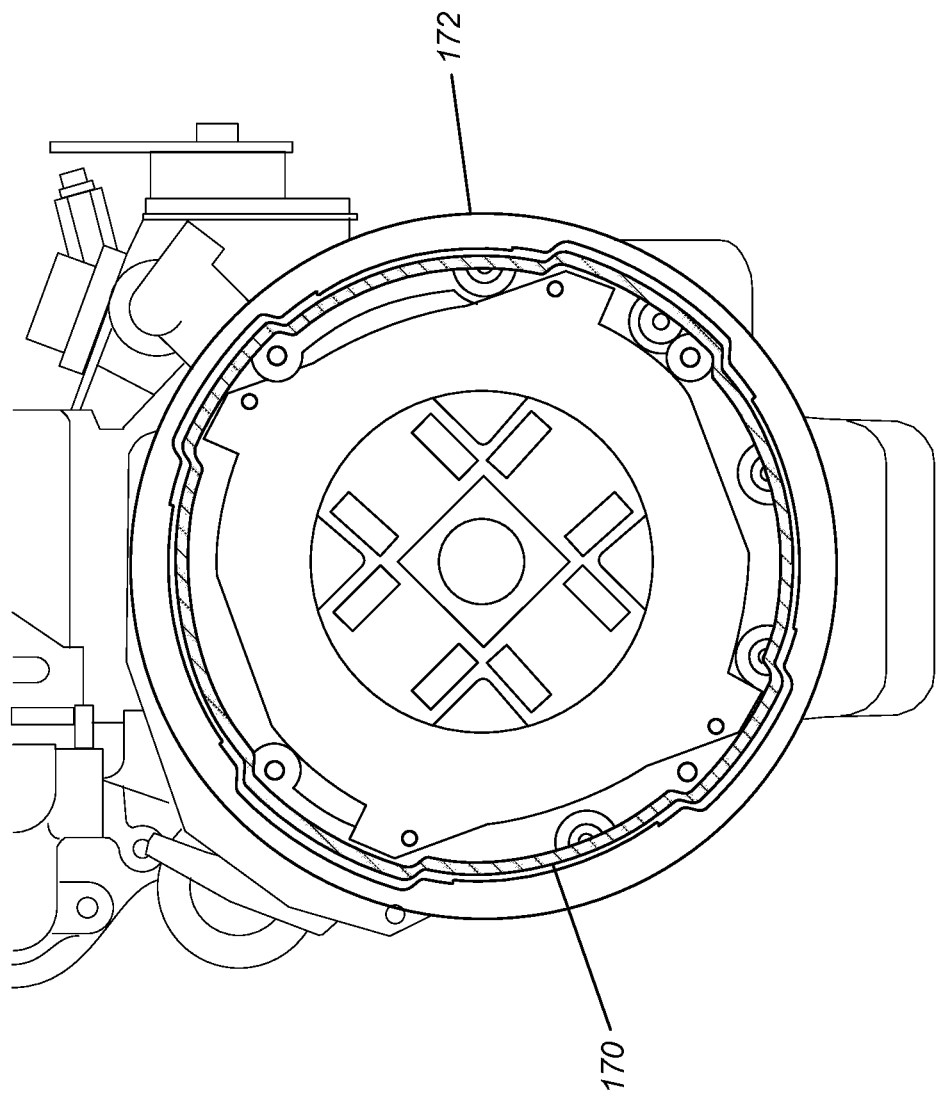
Figure 18A:
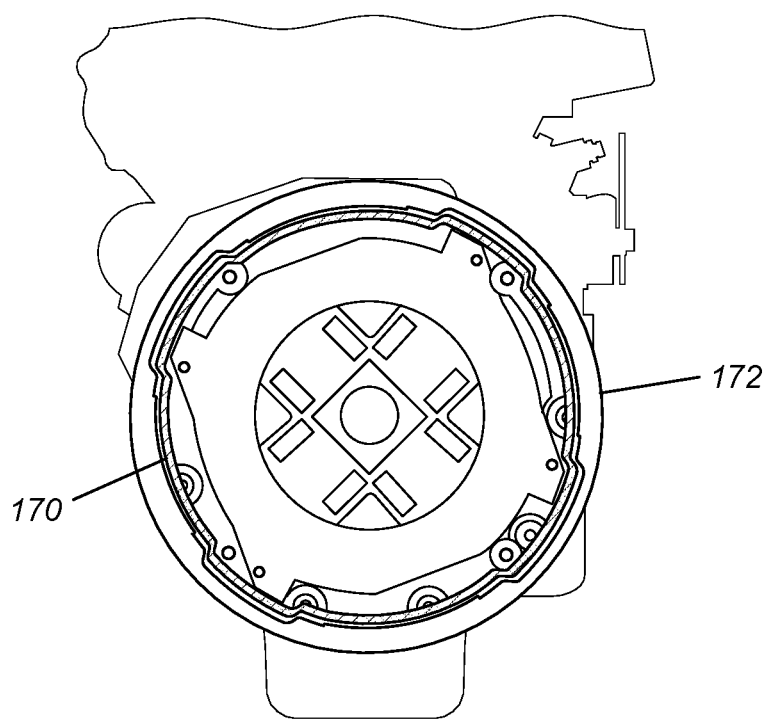
Figure 19:
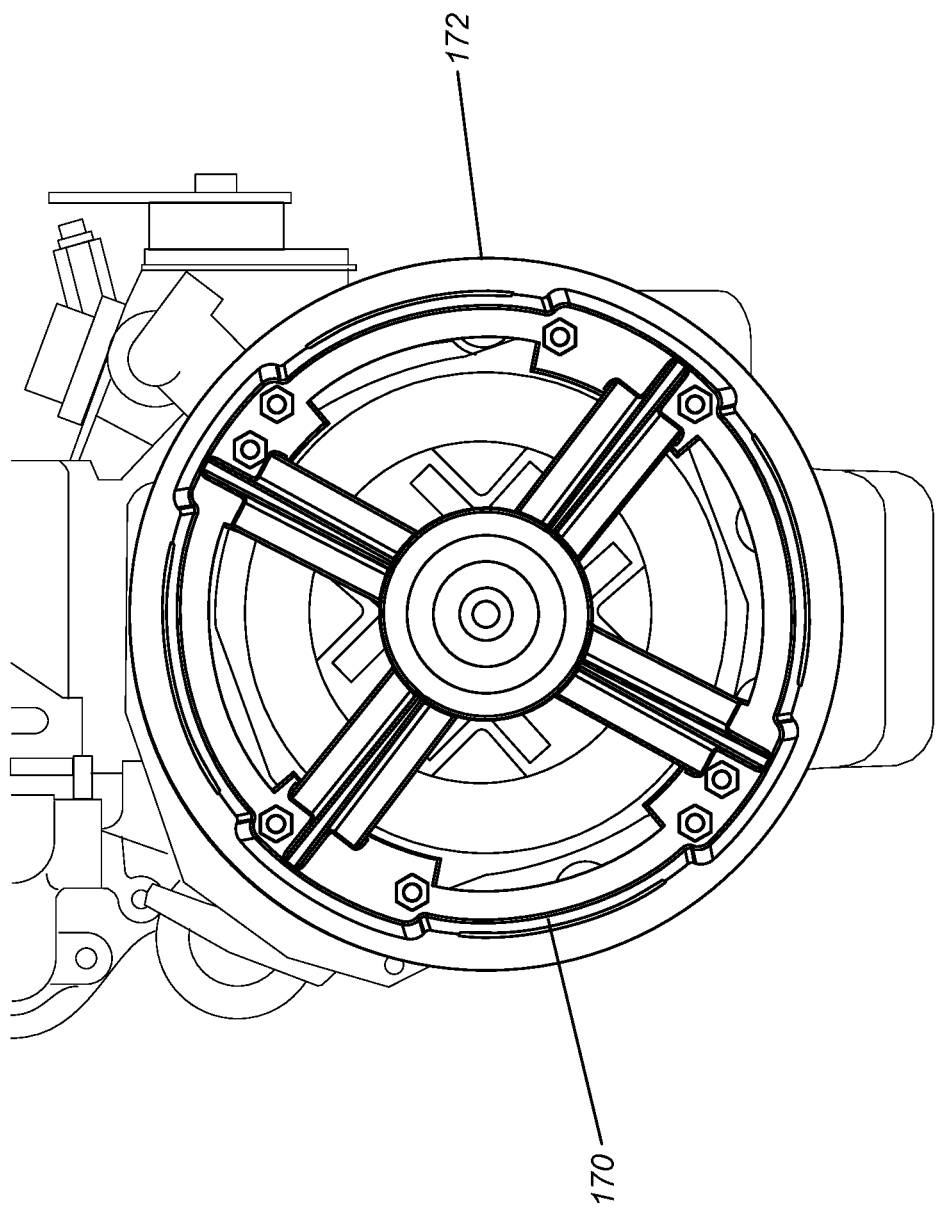

The section and rear views shown in FIGS. 15-16 represent additional views of how the stator assembly 134 fits in the generator housing 106. The raised channels 138 in the housing 106 for the stator ridges 136 have slightly heavier wall thickness, and are in line with the mounting bosses and the features that extend to the bearing support 112. The illustrated shape of the housing 106 also provides a uniform cooling air flow around the stator assembly 134.

Referring to FIGS. 17, 18, 18A, and 19, an alternate embodiment of mounting the generator assembly 104 via through bolts 168 is shown. In this embodiment, the stator is attached to the housing 170 in the same way as shown above. This embodiment includes ring or flange 172 disposed at the adapter side of the generator housing 170. The ring 172 helps prevent the mounting surface from spreading out on the pilot on the adapter in view of how it would be loaded with the through bolts 168. Through bolts 168 are fastened via respective nuts 174. As shown in further detail in the cross-section views of FIGS. 18, 18A, and 19, the nominal wall thickness of the housing 106 is constant in this embodiment.

While various aspects and embodiments have been disclosed, other aspects and embodiments are contemplated. The various aspects and embodiments disclosed are for purposes of illustration and are not intended to be limiting, with the true scope and spirit being indicated by the following claims.

The preceding description of the disclosed embodiments is provided to enable any person skilled in the art to make and use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A generator housing comprising:
   an annular wall having a first side and a second side, wherein the second side comprises an aperture configured to receive a generator and one or more cutouts to enable air circulation in the generator housing;
   a support ring disposed at the first side of the annular wall, the support ring configured to support a rotor shaft bearing of a generator; and
   a plurality of mounting bosses extending outwardly from the aperture at the second side of the annular wall and configured to attach the housing to an engine adapter,
   wherein, the generator housing is cast as a single one-piece construction defining a unitary structure that encloses the generator.

2. The generator housing of claim 1, comprising angled tips extending between the support ring and the annular wall and supporting the support ring in spaced apart relation from the first side.

3. The generator housing of claim 2, being a die-cast one-piece construction.

4. The generator housing of claim 3, being made of aluminum.

5. The generator housing of claim 2, wherein each angled tip comprising an outwardly facing ribbed surface.

6. The generator housing of claim 1, wherein each mounting boss includes a pair of machined piloting surfaces.

7. The generator housing of claim 1, comprising channels extending axially along an interior surface of the annular wall.

8. The generator housing of claim 1, comprising a plurality of interior bosses located at an interior of the first side, each interior boss including a hole through which can extend a threaded bolt.

9. The generator housing of claim 1, comprising:
   channels extending axially along an interior surface of the annular wall; and
   a plurality of interior bosses located at the first side, each interior boss including a hole through which can extend a threaded bolt,
   wherein, each channel extends between a respective mounting boss of said plurality of mounting bosses and a respective interior boss of said plurality of interior bosses, and the generator housing is made of die-cast aluminum.

10. A welding machine comprising:
    an engine;
    a generator mechanically coupled to the engine, wherein the generator comprises a rotor assembly that is arranged to rotate relative to a stator assembly; and
    a generator housing enclosing the generator, the generator housing comprising:
    (a) an annular wall having a first side and a second side, wherein the second side comprises an aperture configured to receive the generator,
    (b) a support ring disposed at the first side of the annular wall, the support ring configured to support a rotor shaft bearing of the generator, and
    (c) a plurality of mounting bosses extending outwardly from the aperture at the second side of the annular wall and configured to attach the generator housing to an engine adapter,
    wherein, the generator housing is cast as a single one-piece construction defining a unitary structure that encloses the stator assembly entirely along its axial length.

11. The welding machine of claim 10, wherein the generator housing comprises angled tips extending between the support ring and the annular wall and supporting the support ring in spaced apart relation from the first side.

12. The welding machine of claim 11, wherein the generator housing is a die-cast one-piece construction.

13. The welding machine of claim 12, wherein the generator housing is made of aluminum.

14. The welding machine of claim 11, wherein each angled tip comprising an outwardly facing ribbed surface.

15. The welding machine of claim 10, wherein each first mounting boss includes a pair of machined piloting surfaces.

16. The welding machine of claim 10, wherein the generator housing comprises channels extending axially along an interior surface of the annular wall.

17. The welding machine of claim 10, wherein the generator housing comprises a plurality of interior bosses located at an interior of the first side, each interior boss including a hole through which can extend a threaded bolt.

18. The welding machine of claim 10, wherein the engine has a flywheel and the rotor assembly is attached to the flywheel, the rotor assembly having a flange with cooling blades.

19. The welding machine of claim 10, wherein:
    the generator housing comprises (d) channels extending axially along an interior surface of the annular wall, and (e) a plurality of interior bosses located at the first side, each interior boss including a hole through which can extend a threaded bolt,
    each channel extends between a respective first mounting boss of said plurality of mounting bosses and a respective interior boss of said plurality of interior bosses, and the generator housing is made of die-cast aluminum.

20. A welding machine comprising:
    an engine;
    a generator mechanically coupled to the engine; and
    a unitary generator housing enclosing the generator, the unitary generator housing comprising:
    (a) an annular wall having a first side and a second side, wherein the second side comprises an aperture configured to receive the generator and one or more cutouts to enable air circulation in the unitary generator housing, (b) a support ring disposed at the first side of the annular wall, the support ring configured to support a rotor shaft bearing of the generator, (c) a plurality of first mounting bosses extending outwardly from the aperture at the second side of the annular wall and configured to attach the housing to an engine adapter, (d) channels extending axially along an interior surface of the annular wall, and (e) a plurality of interior bosses located at the first side, each interior boss including a hole through which can extend a threaded bolt, wherein, the unitary generator housing is cast as a single, one-piece construction, the engine adapter has a plurality of second mounting bosses, the first and second mounting bosses being positioned in aligned relationship along a circumference of the second side, the generator has portions received within the channels, the generator has one or more threaded bolts extending through the hole of a respective interior boss, the generator has a shaft supported by the support ring, and the generator housing is made of aluminum.

21. The welding machine of claim 20, wherein the engine has a flywheel and the generator has a rotor attached to the flywheel, the rotor having a flange with cooling blades.

* * * * *